(12) United States Patent
Hedayati et al.

(10) Patent No.: US 9,413,400 B1
(45) Date of Patent: Aug. 9, 2016

(54) BLOCKER FILTERING FOR CARRIER AGGREGATION RECEIVER

(71) Applicant: QUALCOMM Incorporated, San Diego, CA (US)

(72) Inventors: Hajir Hedayati, San Diego, CA (US); Vladimir Aparin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/700,552

(22) Filed: Apr. 30, 2015

(51) Int. Cl.
H04B 1/10 (2006.01)
H04L 25/03 (2006.01)

(52) U.S. Cl.
CPC ........ H04B 1/1027 (2013.01); H04L 25/03159 (2013.01); *H04B 2001/1072* (2013.01)

(58) Field of Classification Search
CPC ...... H04B 7/0845; H04B 1/0017; H04B 1/10; H04L 27/148; H04L 27/2334; H04L 27/06; H03F 2200/294; H03F 1/0205; H03F 2200/91; H03F 2200/336; H03F 1/3247; H03F 2200/387; H03F 2200/541; H03F 2200/408; H03D 7/146
USPC .......................................... 375/25–297, 350
See application file for complete search history.

(56) References Cited

U.S. PATENT DOCUMENTS

| | | | | |
|---|---|---|---|---|
| 8,055,231 B2 * | 11/2011 | Muhammad | .......... | H03M 1/183 375/345 |
| 8,106,710 B2 * | 1/2012 | Montalvo | ................ | H03F 3/195 330/254 |
| 8,369,807 B2 * | 2/2013 | Mikhemar | ............... | H04B 1/38 375/320 |
| 8,649,749 B2 * | 2/2014 | He | ............................ | H04B 1/28 330/252 |
| 8,660,041 B2 | 2/2014 | Niskanen et al. | | |
| 8,670,739 B1 * | 3/2014 | Murphy | ............... | H04B 1/1027 375/350 |
| 8,750,818 B2 * | 6/2014 | Chung | ...................... | H03F 1/26 455/296 |
| 8,767,869 B2 | 7/2014 | Rimini et al. | | |
| 8,798,570 B2 * | 8/2014 | Fahim | ................... | H03G 3/3052 455/296 |
| 8,849,227 B2 * | 9/2014 | Feng | ...................... | H04B 17/21 329/319 |

(Continued)

FOREIGN PATENT DOCUMENTS

WO 2014133625 A2 9/2014

OTHER PUBLICATIONS

Park C.S., et al., "Optimum Antenna Combining in Presence of TX Leakage," Electronics Letters, Jan. 30, 2014, vol. 50 (3), pp. 223-225.

(Continued)

Primary Examiner — Emmanuel Bayard
(74) Attorney, Agent, or Firm — Arent Fox LLP

(57) ABSTRACT

A method, an apparatus, and system for filtering a signal in a carrier aggregation system are provided. The apparatus processes carriers via at least two respective paths. Each path receives, via a transconducting module, an input signal and generates a current signal based on the input signal, shifts, via a mixing module, a frequency of the current signal by mixing the current signal with a local oscillating signal corresponding to a respective path, and generates, via an amplifying module, an output voltage signal based on the frequency-shifted signal and a response of the respective path. The apparatus attenuates, via a filtering module, a jamming signal in the input signal to produce responses for the at least two paths, respectively. A response for the respective path has a maximum input impedance at a frequency of the local oscillating signal corresponding to the respective path.

24 Claims, 14 Drawing Sheets

(56) References Cited

U.S. PATENT DOCUMENTS

| | | | | |
|---|---|---|---|---|
| 9,001,740 | B2* | 4/2015 | Darabi | H04B 1/406 370/277 |
| 9,002,295 | B2* | 4/2015 | Mirzaei | H04L 27/34 455/130 |
| 9,014,653 | B2* | 4/2015 | Madadi | H03B 1/00 375/319 |
| 9,020,450 | B2* | 4/2015 | Rossi | H04B 1/40 455/103 |
| 9,031,515 | B2* | 5/2015 | Mikhemar | H03F 3/195 333/202 |
| 9,148,186 | B1* | 9/2015 | Wu | H04B 1/123 |
| 9,209,910 | B2 | 12/2015 | Hedayati et al. | |
| 9,219,507 | B2* | 12/2015 | Rofougaran | H04B 1/10 |
| 2007/0098118 | A1* | 5/2007 | Muhammad | H04B 1/123 375/344 |
| 2008/0132189 | A1* | 6/2008 | Maxim | H04B 1/28 455/280 |
| 2008/0139141 | A1* | 6/2008 | Varghese | H03F 1/3247 455/114.3 |
| 2008/0139162 | A1* | 6/2008 | Hafizi | H04B 1/30 455/325 |
| 2008/0175307 | A1 | 7/2008 | Brunn et al. | |
| 2012/0238232 | A1* | 9/2012 | Murphy | H04B 1/16 455/326 |
| 2014/0036973 | A1* | 2/2014 | Au | H03F 1/3247 375/221 |
| 2014/0132357 | A1 | 5/2014 | Larson et al. | |
| 2014/0140455 | A1* | 5/2014 | Mirzaei | H04B 1/006 375/350 |
| 2014/0171006 | A1* | 6/2014 | Murphy | H04B 15/06 455/296 |
| 2014/0269857 | A1 | 9/2014 | Rimini et al. | |
| 2014/0329484 | A1 | 11/2014 | Lau et al. | |
| 2015/0063509 | A1 | 3/2015 | Hedayati et al. | |
| 2015/0180521 | A1* | 6/2015 | Tripurari | H03D 7/1441 375/349 |

OTHER PUBLICATIONS

C. Andrews, A.C. Molnar, "A Passive Mixer-First Receiver with Digitally Controlled and Widely Tunable RF Interface," IEEE JSSC, vol. 45, No. 12, pp. 2696, 2708, Dec. 2010.

D. Murphy et al., "A Blocker-Tolerant Wideband Noise-Cancelling Receiver with a 2dB Noise Figure," ISSCC Dig. Tech. papers, pp. 74-76, Feb. 2012.

International Search Report and Written Opinion—PCT/US2016/025025—ISA/EPO—Jun. 13, 2010.

Murphy D., et al., "A Blocker—Tolerant Wideband Noise—Cancelling Receiver Suitable for Wideband Wireless Applications" IEEE Journal of Solid-State Circuits, IEEE Service Center, Piscataway, NJ, USA, vol. 47, No. 12, Dec. 1, 2012, pp. 2943-2963, XP011485437, ISSN: 0018-9200, DOI: 10.1109/ USSC.2012.2217832 the whole document.

* cited by examiner

BLOCKER FILTERING FOR CARRIER AGGREGATION RECEIVER

BACKGROUND

1. Field

The present disclosure relates generally to communication systems, integrated circuit (IC) design, and more particularly, to an apparatus (e.g., receiver) and method for filtering blockers and transmitter leakage while supporting carrier aggregation.

2. Background

A wireless device (e.g., a cellular phone or a smartphone) may transmit and receive data for two-way communication with a wireless communication system. The wireless device may include a transmitter for data transmission and a receiver for data reception. For data transmission, the transmitter may modulate a transmit local oscillator (LO) signal with data to obtain a modulated radio frequency (RF) signal, amplify the modulated RF signal to obtain an output RF signal having the desired output power level, and transmit the output RF signal via an antenna to a base station. For data reception, the receiver may obtain a received RF signal via the antenna, downconvert the received RF signal with a receive LO signal, and process the downconverted signal to recover data sent by the base station.

The wireless device may include one or more oscillators to generate one or more oscillator signals at one or more desired frequencies. The oscillator signal(s) may be used to generate the transmit LO signal for the transmitter and the receive LO signal for the receiver. The oscillator(s) may be required to generate the oscillator signal(s) to meet the requirements of the wireless communication system with which the wireless device communicates. The transmitter and the receiver local oscillators may be used to transmit and receive more than one RF signal at the same time.

For a full-duplex wireless device that can simultaneously transmit and receive data, circuitry within the receiver may observe interference from the transmitter. For example, a portion of the transmit signal may leak from a duplexer to the receiver, and the leaked signal (which is commonly referred to as a transmit (TX) leakage signal) may cause interference to a desired signal within the received signal. Since the transmit signal and the desired signal typically reside in two different frequency bands, the TX leakage signal can normally be filtered and typically does not pose a problem in itself. However, the TX leakage signal may interact with a jammer to generate cross modulation distortion components on both sides of the jammer. A jammer is a large amplitude undesired signal that is close in frequency to a desired signal. Some distortion components from the interaction between the TX leakage signal and the jammer may fall within the signal band of the desired signal and would not be filtered out. These distortion components would act as additional noise that may degrade performance. Furthermore, the TX leakage signal may go through a downconverter in the receiver and cause second-order distortion, which is proportional to the square of the TX leakage signal power. The effect of transmitter leakage in carrier aggregation receivers can be more significant. For example, multiple transmitters may exist. Thus, the intermodulation of the transmitter leakage and the local oscillators and their harmonics in a receiver chain, may result in in-band distortion in one of the receiver chains. Accordingly, there is a need for techniques to mitigate the deleterious effects of a TX leakage signal in a wireless device, and specifically in carrier aggregation receivers.

In TDD systems, there may be no TX interference for a receiver, but the same challenge still exists when multiple jammer and blocker signals are present at the input of the receiver. The resulting distortion may land in-band for a desired RF signal. In carrier aggregation, where multiple receiving channels exist, the intermodulation of the jammers with the receiver chain local oscillators may cause distortion for any of the desired receiving paths. Therefore, for TDD systems employing carrier aggregation, there is a need for techniques to suppress jammer signals in a wireless device.

SUMMARY

In an aspect of the disclosure, a method, an apparatus (e.g., carrier aggregation receiver), and system for filtering a signal in a carrier aggregation system are provided. The apparatus is configured to process carriers via at least two respective paths. For each path, the apparatus is configured to, via a transconducting module, receive an input signal and generate a current signal based on the input signal, shift, via a mixing module, a frequency of the current signal by mixing the current signal with a local oscillating signal corresponding to a respective path, and generate, via an amplifying module, an output voltage signal based on the frequency-shifted signal. The apparatus is further configured to receive more than one RF signal through an antenna module while attenuating, via a filtering module, a jamming signal or a transmitter leakage signal at the input of the apparatus. The filtering module, via a respective path, provides a maximum input impedance at the frequencies of desired RF signals which are located at the local oscillating signals corresponding to the respective path. Moreover, the filtering module may provide a minimum impedance for the transmitter leakage signal and the jamming signal, which results in smaller gain via the respective path.

DETAILED DESCRIPTION

Figure 1:
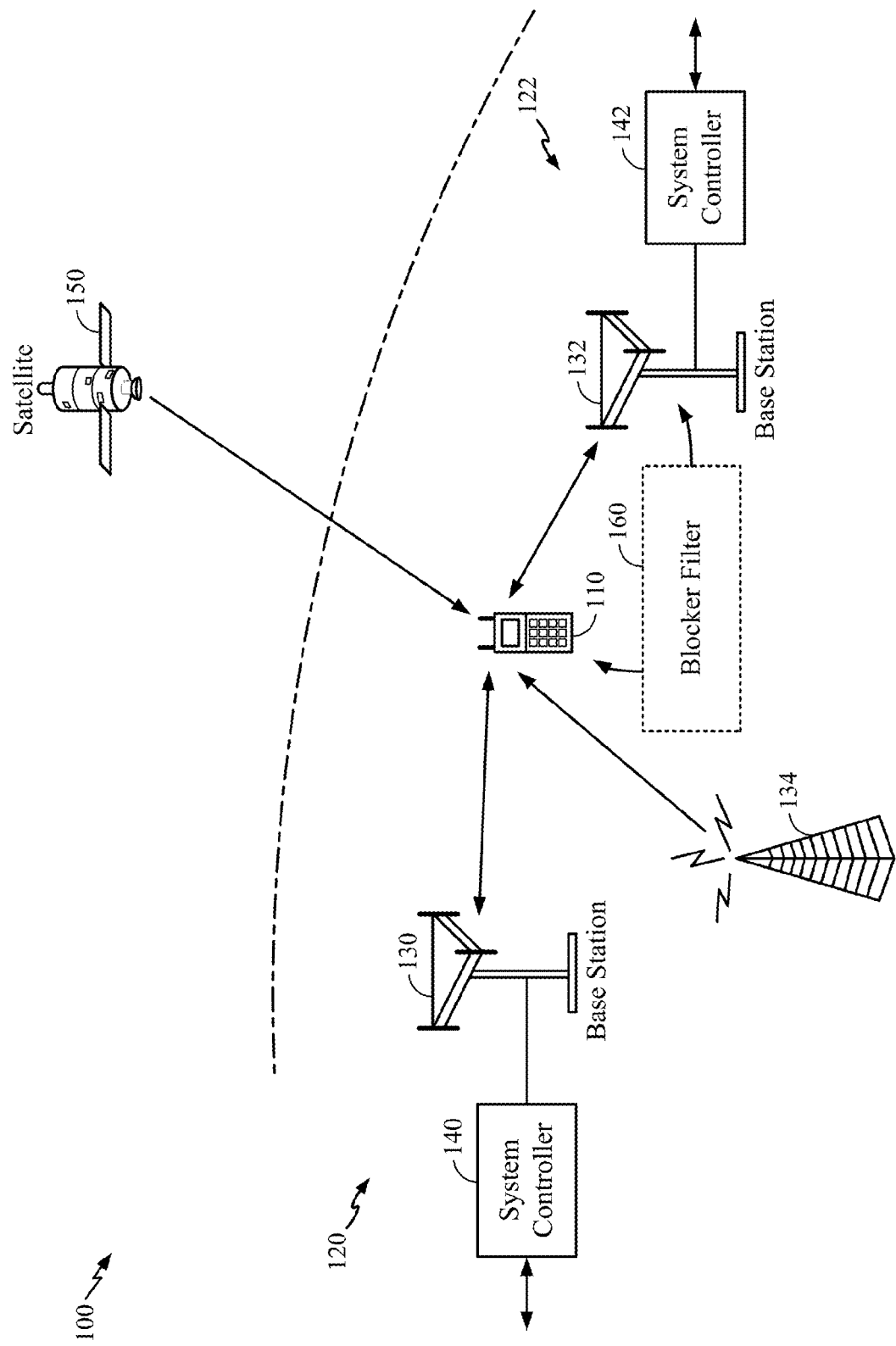
FIG. 1 illustrates a wireless device communicating with different wireless communication systems.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are illustrated in block diagram form in order to avoid obscuring such concepts. The term "exemplary" is used herein to mean "serving as an example, instance, or illustration." Any design described herein as "exemplary" is not necessarily to be construed as preferred or advantageous over other designs.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise random-access memory (RAM), read-only memory (ROM), electronically erasable programmable ROM (EEPROM), compact disk (CD) ROM (CD-ROM), or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram 100 illustrating a wireless device 110 communicating with different wireless communication systems 120, 122. The wireless communication systems 120, 122 may each be a Code Division Multiple Access (CDMA) system, a Global System for Mobile Communications (GSM) system, a Long Term Evolution (LTE) system, a wireless local area network (WLAN) system, or some other wireless system. A CDMA system may implement Wideband CDMA (WCDMA), CDMA 1× or cdma2000, Time Division Synchronous Code Division Multiple Access (TD-SCDMA), or some other version of CDMA. TD-SCDMA is also referred to as Universal Terrestrial Radio Access (UTRA) Time Division Duplex (TDD) 1.28 Mcps Option or Low Chip Rate (LCR). LTE supports both frequency division duplexing (FDD) and time division duplexing (TDD). For example, the wireless communication system 120 may be a GSM system, and the wireless communication system 122 may be a WCDMA system. As another example, the wireless communication system 120 may be an LTE system, and the wireless communication system 122 may be a CDMA system.

For simplicity, the diagram 100 illustrates the wireless communication system 120 including one base station 130 and one system controller 140, and the wireless communication system 122 including one base station 132 and one system controller 142. In general, each wireless system may include any number of base stations and any set of network entities. Each base station may support communication for wireless devices within the coverage of the base station. The base stations may also be referred to as a Node B, an evolved Node B (eNB), an access point, a base transceiver station, a radio base station, a radio transceiver, a transceiver function, a basic service set (BSS), an extended service set (ESS), or some other suitable terminology. The wireless device 110 may also be referred to as a user equipment (UE), a mobile device, a remote device, a wireless device, a wireless communications device, a station, a mobile station, a subscriber station, a mobile subscriber station, a terminal, a mobile terminal, a remote terminal, a wireless terminal, an access terminal, a client, a mobile client, a mobile unit, a subscriber unit, a wireless unit, a remote unit, a handset, a user agent, or some other suitable terminology. The wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, or some other similar functioning device.

The wireless device 110 may be capable of communicating with the wireless communication system 120 and/or 122. The wireless device 110 may also be capable of receiving signals from broadcast stations, such as the broadcast station 134. The wireless device 110 may also be capable of receiving signals from satellites, such as the satellite 150, in one or more global navigation satellite systems (GNSS). The wireless device 110 may support one or more radio technologies for wireless communication such as GSM, WCDMA, cdma2000, LTE, 802.11, etc. The terms "radio technology," "radio access technology," "air interface," and "standard" may be used interchangeably.

The wireless device 110 may communicate with a base station in a wireless system via the downlink and the uplink. The downlink (or forward link) refers to the communication link from the base station to the wireless device, and the uplink (or reverse link) refers to the communication link from the wireless device to the base station. A wireless system may utilize TDD and/or FDD. For TDD, the downlink and the uplink share the same frequency, and downlink transmissions and uplink transmissions may be sent on the same frequency in different time periods.

For FDD, the downlink and the uplink are allocated separate frequencies. Downlink transmissions may be sent on one frequency, and uplink transmissions may be sent on another frequency. Some exemplary radio technologies supporting TDD include GSM, LTE, and TD-SCDMA. Some exemplary radio technologies supporting FDD include WCDMA, cdma2000, and LTE. The wireless device 110 and/or the base stations 130, 132 may include an exemplary blocker filter 160. An exemplary blocker filter 160 is provided infra.

Figure 2A:
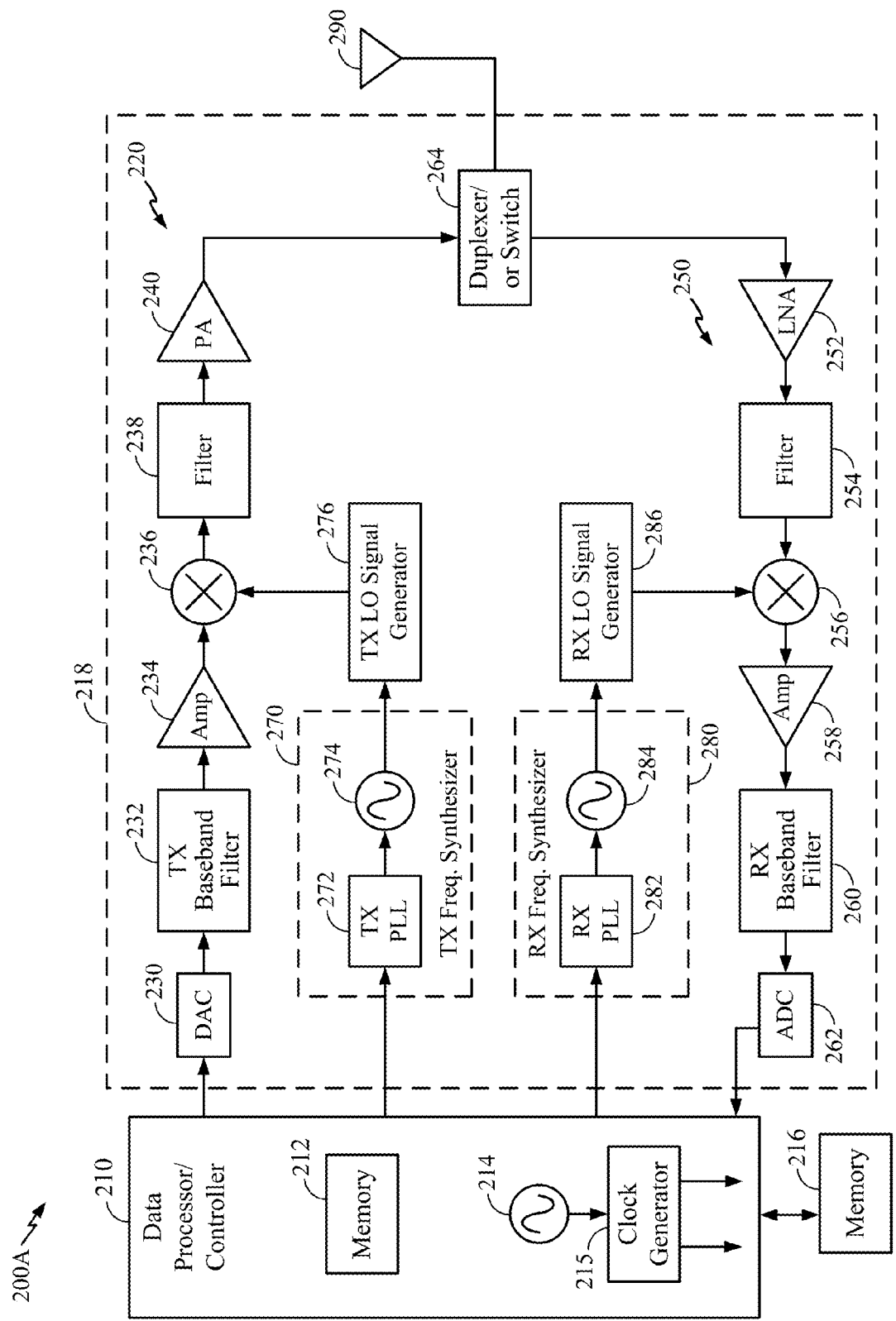
FIG. 2A is a block diagram of a wireless device.

FIG. 2A is a block diagram 200A of an exemplary wireless device, such as the wireless device 110. The wireless device includes a data processor/controller 210, a transceiver 218, and an antenna 290. The data processor/controller 210 may be referred to as a processing system. A processing system may include the data processor/controller 210 or both the data processor/controller 210 and the memory 216. The transceiver 218 includes a transmitter 220 and a receiver 250 that support bi-directional communication. The transmitter 220 and/or the receiver 250 may be implemented with a super-heterodyne architecture or a direct-conversion architecture. In the super-heterodyne architecture, a signal is frequency converted between RF and baseband in multiple stages, e.g., from RF to an intermediate frequency (IF) in one stage, and then from IF to baseband in another stage for a receiver. In the direct-conversion architecture, which is also referred to as a zero-IF architecture, a signal is frequency converted between RF and baseband in one stage. The super-heterodyne and direct-conversion architectures may use different circuit blocks and/or have different requirements. In the exemplary design illustrated in FIG. 2A, the transmitter 220 and the receiver 250 are implemented with the direct-conversion architecture.

In the transmit path, the data processor/controller 210 may process (e.g., encode and modulate) data to be transmitted and provide the data to a digital-to-analog converter (DAC) 230. The DAC 230 converts a digital input signal to an analog output signal. The analog output signal is provided to a transmit (TX) baseband (lowpass) filter 232, which may filter the analog output signal to remove images caused by the prior digital-to-analog conversion by the DAC 230. An amplifier (amp) 234 may amplify the signal from the TX baseband filter 232 and provide an amplified baseband signal. An upconverter (mixer) 236 may receive the amplified baseband signal and a TX LO signal from a TX LO signal generator 276. The upconverter 236 may upconvert the amplified baseband signal with the TX LO signal and provide an upconverted signal. A filter 238 may filter the upconverted signal to remove images caused by the frequency upconversion. A power amplifier (PA) 240 may amplify the filtered RF signal from the filter 238 to obtain the desired output power level and provide an output RF signal. The output RF signal may be routed through a duplexer/switchplexer 264.

For FDD, the transmitter 220 and the receiver 250 may be coupled to the duplexer 264, which may include a TX filter for the transmitter 220 and a receive (RX) filter for the receiver 250. The TX filter may filter the output RF signal to pass signal components in a transmit band and attenuate signal components in a receive band. For TDD, the transmitter 220 and the receiver 250 may be coupled to switchplexer 264. The switchplexer 264 may pass the output RF signal from the transmitter 220 to the antenna 290 during uplink time intervals. For both FDD and TDD, the duplexer/switchplexer 264 may provide the output RF signal to the antenna 290 for transmission via a wireless channel.

In the receive path, the antenna 290 may receive signals transmitted by base stations and/or other transmitter stations and may provide a received RF signal. The received RF signal may be routed through duplexer/switchplexer 264. For FDD, the RX filter within the duplexer/switchplexer 264 may filter the received RF signal to pass signal components in a receive band and attenuate signal components in the transmit band. For TDD, the duplexer/switchplexer 264 may pass the received RF signal from the antenna 290 to the receiver 250 during downlink time intervals. For both FDD and TDD, the duplexer/switchplexer 264 may provide the received RF signal to the receiver 250.

Within the receiver 250, the received RF signal may be amplified by a low noise amplifier (LNA) 252 and filtered by a filter 254 to obtain an input RF signal. A downconverter (mixer) 256 may receive the input RF signal and an RX LO signal from an RX LO signal generator 286. The downconverter (mixer) 256 may downconvert the input RF signal with the RX LO signal and provide a downconverted signal. The downconverted signal may be amplified by an amplifier 258 and further filtered by an RX baseband (lowpass) filter 260 to obtain an analog input signal. In an aspect, the exemplary blocker filter 160 may be implemented by one or more of the LNA 252, the filter 254, the downconverter (mixer) 256, and the amplifier 258. The analog input signal is provided to an analog-to-digital converter (ADC) 262. The ADC 262 converts an analog input signal to a digital output signal. The digital output signal is provided to the data processor/controller 210.

A TX frequency synthesizer 270 may include a TX phase-locked loop (PLL) 272 and a VCO 274. The VCO 274 may generate a TX VCO signal at a desired frequency. The TX PLL 272 may receive timing information from the data processor/controller 210 and generate a control signal for the VCO 274. The control signal may adjust the frequency and/or the phase of the VCO 274 to obtain the desired frequency for the TX VCO signal. The TX frequency synthesizer 270 provides the TX VCO signal to the TX LO signal generator 276. The TX LO signal generator 276 may generate a TX LO signal based on the TX VCO signal received from the TX frequency synthesizer 270.

An RX frequency synthesizer 280 may include an RX PLL 282 and a VCO 284. The VCO 284 may generate an RX VCO signal at a desired frequency. The RX PLL 282 may receive timing information from the data processor/controller 210 and generate a control signal for the VCO 284. The control signal may adjust the frequency and/or the phase of the VCO 284 to obtain the desired frequency for the RX VCO signal. The RX frequency synthesizer 280 provides the RX VCO signal to the RX LO signal generator 286. The RX LO signal generator may generate an RX LO signal based on the RX VCO signal received from the RX frequency synthesizer 280.

The LO signal generators 276, 286 may each include frequency dividers, buffers, etc. The LO signal generators 276, 286 may be referred to as frequency dividers if they divide a frequency provided by the TX frequency synthesizer 270 and the RX frequency synthesizer 280, respectively. The PLLs 272, 282 may each include a phase/frequency detector, a loop filter, a charge pump, a frequency divider, etc. Each VCO signal and each LO signal may be a periodic signal with a particular fundamental frequency. The TX LO signal and the RX LO signal from the LO signal generators 276, 286 may have the same frequency for TDD or different frequencies for FDD. The TX VCO signal and the RX VCO signal from the VCOs 274, 284 may have the same frequency (e.g., for TDD) or different frequencies (e.g., for FDD or TDD).

The conditioning of the signals in the transmitter 220 and the receiver 250 may be performed by one or more stages of amplifier, filter, upconverter, downconverter, etc. These circuits may be arranged differently from the configuration illustrated in FIG. 2A. Furthermore, other circuits not shown in FIG. 2A may also be used to condition the signals in the transmitter 220 and the receiver 250. For example, impedance matching circuits may be located at the output of the PA 240, at the input of the LNA 252, between the antenna 290 and the duplexer/switchplexer 264, etc. Some circuits in FIG. 2A may also be omitted. For example, the filter 238 and/or the filter 254 may be omitted. All or a portion of the transceiver 218 may be implemented on one or more analog integrated circuits (ICs), RF ICs (RFICs), mixed-signal ICs, etc. For example, the TX baseband filter 232 to the PA 240 in the transmitter 220, the LNA 252 to the RX baseband filter 260 in the receiver 250, the PLLs 272, 282, the VCOs 274, 284, and the LO signal generators 276, 286 may be implemented on an RFIC. The PA 240 and possibly other circuits may also be implemented on a separate IC or a circuit module.

The data processor/controller 210 may perform various functions for the wireless device. For example, the data processor/controller 210 may perform processing for data being transmitted via the transmitter 220 and received via the receiver 250. The data processor/controller 210 may control the operation of various circuits within the transmitter 220 and the receiver 250. The memory 212 and/or the memory 216 may store program codes and data for the data processor/controller 210. The memory may be internal to the data processor/controller 210 (e.g., the memory 212) or external to the data processor/controller 210 (e.g., the memory 216). The memory may be referred to as a computer-readable medium. An oscillator 214 may generate a VCO signal at a particular frequency. A clock generator 215 may receive the VCO signal(s) from the oscillator 214 and may generate clock signals for various modules within the data processor/controller 210, the transceiver 218, or both. The data processor/controller 210 may be implemented on one or more application-specific integrated circuits (ASICs), other ICs, or some combination of both.

Figure 2B:
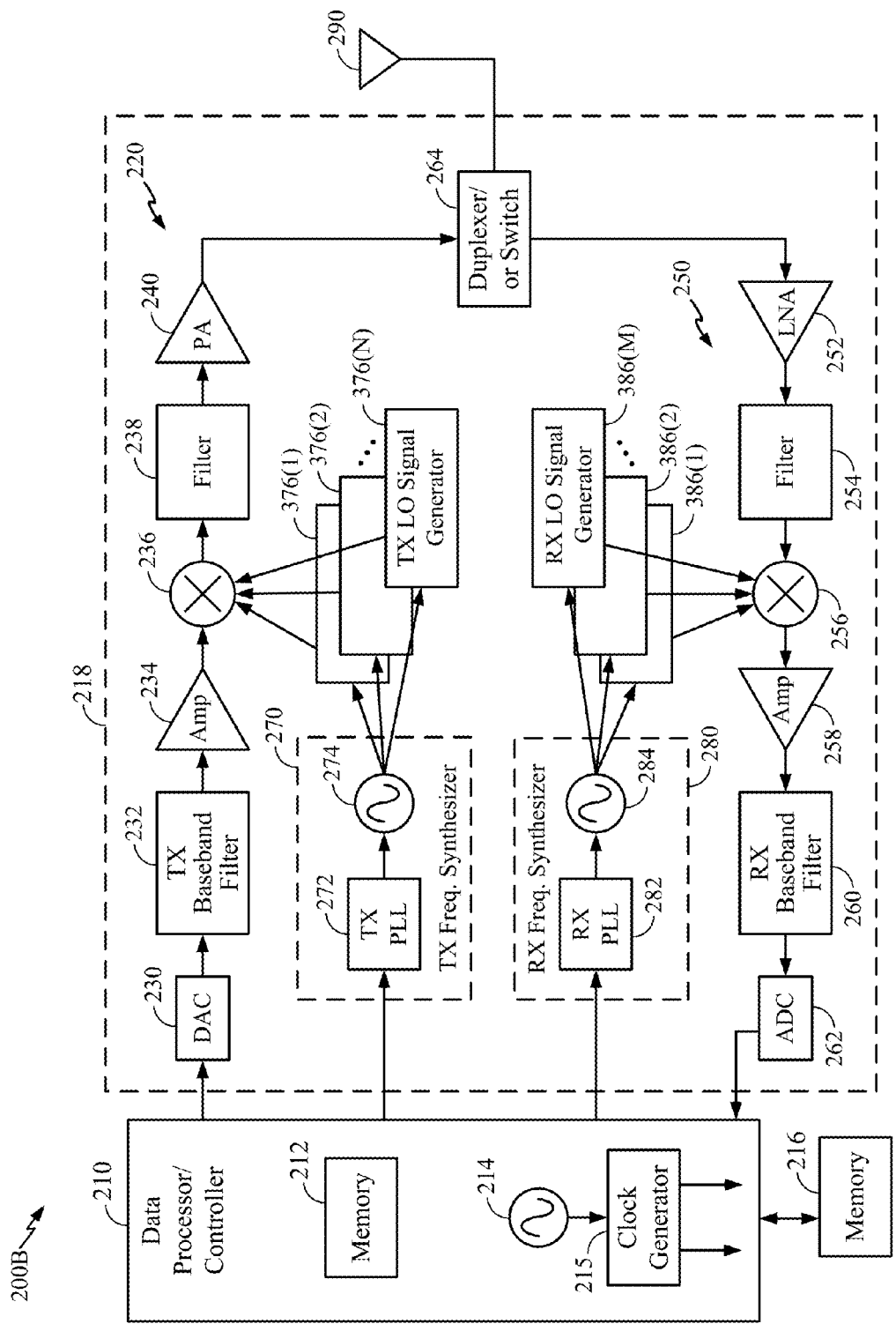
FIG. 2B is a block diagram of another exemplary wireless device.

FIG. 2B is a block diagram 200B of another exemplary wireless device, such as the wireless device 110. The wireless device depicted in FIG. 2B includes many of the same elements, modules, components, or some combination of these as the wireless device depicted in FIG. 2A. Therefore, the identification and description of those same elements, modules, and/or components will not be discussed for brevity.

In an aspect, the transceiver 218 of FIG. 2B is capable of supporting carrier aggregation. Accordingly, the transceiver 218 may include a number of TX LO signal generators, e.g., TX LO signal generators 376(1), 376(2), . . . , 376(N), where N is an integer. Moreover, the transceiver 218 may include a number of RX LO signal generators, e.g., RX LO signal generators 386(1), 386(2), . . . , 386(M), where M is an integer.

The TX frequency synthesizer 270 may provide a TX VCO signal to one or more of the TX LO signal generators 376(1), 376(2), . . . , 376(N). Each of the TX LO signal generators 376(1), 376(2), . . . , 376(N) may generate a TX LO signal based on the TX VCO signal received from the TX frequency synthesizer 270. The RX frequency synthesizer 280 may provide an RX VCO signal to one or more of the RX LO signal generators 386(1), 386(2), . . . , 386(M). Each of the RX LO signal generators 386(1), 386(2), . . . , 386(M) may generate an RX LO signal based on the RX VCO signal received from the RX frequency synthesizer 280.

The TX LO signal generators 376(1), 376(2), . . . , 376(N) and the RX LO signal generators 386(1), 386(2), . . . , 386(M) may each include frequency dividers, buffers, etc. The TX LO signal generators 376(1), 376(2), . . . , 376(N) may be referred to as frequency dividers if they divide a frequency provided by the TX frequency synthesizer 270. The RX LO signal generators 386(1), 386(2), . . . , 386(M) may be referred to as frequency dividers if they divide a frequency provided by the RX frequency synthesizer 280. Each VCO signal and each LO signal may be a periodic signal with a particular fundamental frequency. The TX LO signal from the TX LO signal generators 376(1), 376(2), . . . , 376(N) and the RX LO signal from the RX LO signal generators 386(1), 386(2), . . . , 386(M) may have the same frequency for TDD or different frequencies for FDD.

In a carrier aggregation architecture, TX leakage may limit the receiver performance during concurrent downlink carrier aggregation operations. For example, the down-converted intermodulation of the TX leakage with different spurs, such as an LO signal, a 2LO signal, a 4LO signal, jammers/blockers, or combinations of these may cause RX desense. A jammer resistant noise canceling receiver front end is described in U.S. patent application Ser. No. 13/875,093, JAMMER RESISTANT NOISE CANCELLING RECEIVER FRONT END, filed May 1, 2013, incorporated herein by reference in its entirety.

As another example, in an intra-carrier aggregation operation where one LNA is used followed by cascode devices or additional transconductance ($G_M$) stages, an output of the LNA is a high impedance node. This may cause a large TX leakage swing, thus causing issues with linearity and coupling in a multi-carrier aggregation operation. As a further example, in concurrent carrier aggregation operations, a noise factor (NF) of a first carrier may be severely degraded if a concurrent second carrier is much larger and acts as a jammer with respect to the first carrier. Accordingly, the present disclosure provides an apparatus and method for rejecting TX leakage and jammers/blockers together with LO signal harmonics to maintain/improve the quality of receiver sensitivity during concurrent carrier aggregation operations. Furthermore, the present disclosure provides for attenuating an undesired carrier signal leaking into a desired carrier signal.

Figure 3:
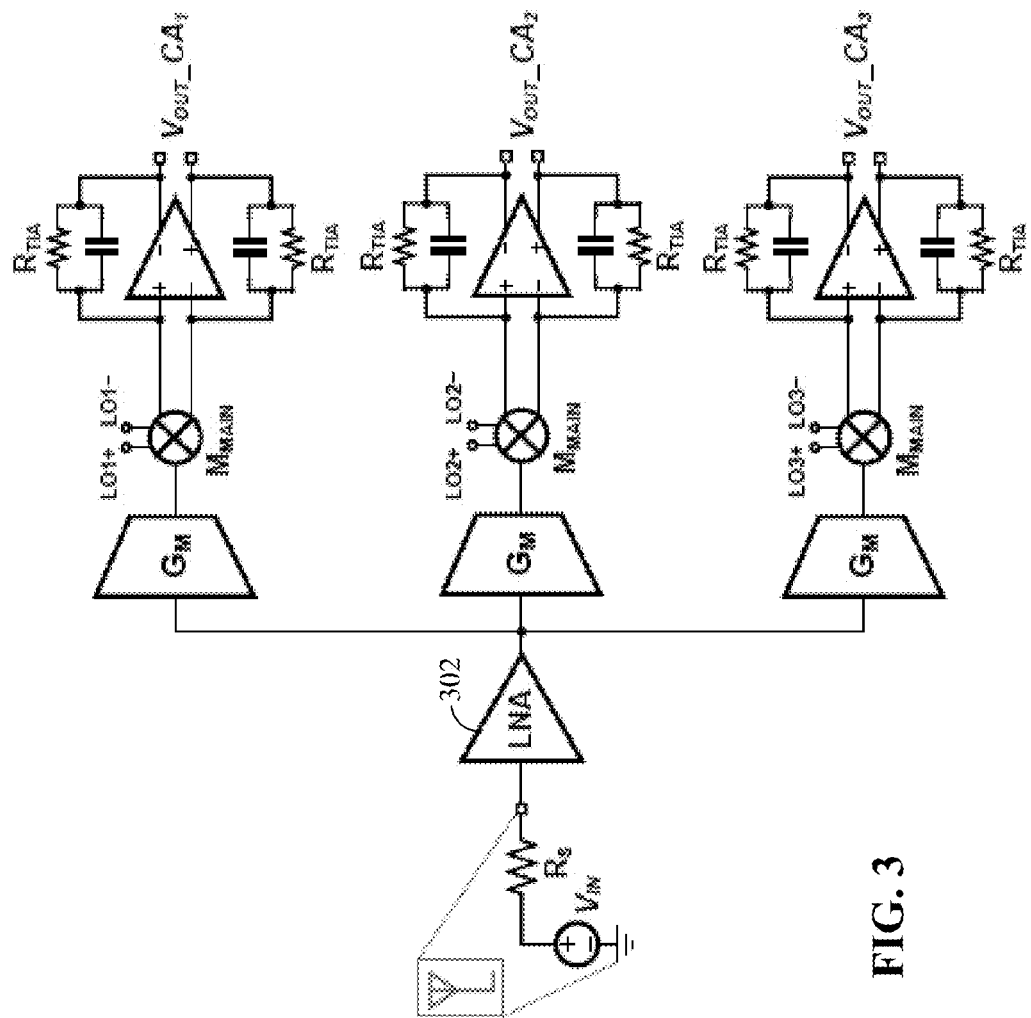
FIG. 3 is a diagram of an example three-downlink intra-carrier aggregation architecture.

FIG. 3 is a diagram 300 of an example three-downlink intra-carrier aggregation architecture. In carrier aggregation, a number of downlink carriers (e.g., 3-4 downlink carriers and a number uplink carriers (e.g., 2-3 uplink carriers) may be in operation. A TX leakage signal may pass through a duplexer (e.g., duplexer/switchplexer 264) and is present at the input of a receiver (e.g., LNA 252 or LNA 302). The TX leakage signal may be problematic when the TX leakage signal combines with a blocker/jammer signal meant for another receiver. For example, the blocker/jammer signal may be a signal meant for a nearby mobile device or a signal transmitted on a channel near a current operating channel. The TX leakage signal may interact with the blocker/jammer signal to generate cross modulation distortion components/non-linear components at the input (LNA 252 or LNA 302) of the receiver (at the base baseband). Some distortion components from the interaction between the TX leakage signal and the blocker/jammer signal may fall within the signal band of a desired signal and would not be filtered out. Similar interaction of TX leakage or jammers with any of the LO harmonics (e.g. LO1, LO2) may result in distortion for the desired signal. These distortion components would act as additional noise that may degrade performance. Furthermore, the TX leakage signal may go through a downconverter (mixer) 256 in the receiver and cause second-order distortion. For example, because the LNA output is a high-impedance node, the LNA output will increase the TX leakage and blocker/jammer swing, which degrades linearity. A third-order input intercept point (IIP3) may be limited to −5 dBm. Non-linearity may also be due to a limited gain bandwidth (GBW) of a transimpedance amplifier (TIA) at a blocker/jammer offset frequency, especially when no input capacitor is at the input of the TIA. In some examples, blocker filtering may be used. Blocker filtering is described in U.S. patent application Ser. No. 14/227,877, BLOCKER FILTERING FOR NOISE-CANCELLING RECEIVER, filed Mar. 27, 2014, incorporated herein by reference in its entirety.

In an aspect, the present disclosure provides an on-chip approach for filtering TX leakage and jammers in a carrier aggregation system. In an example, the on-chip approach may utilize one or more N-path filters.

Figure 4:
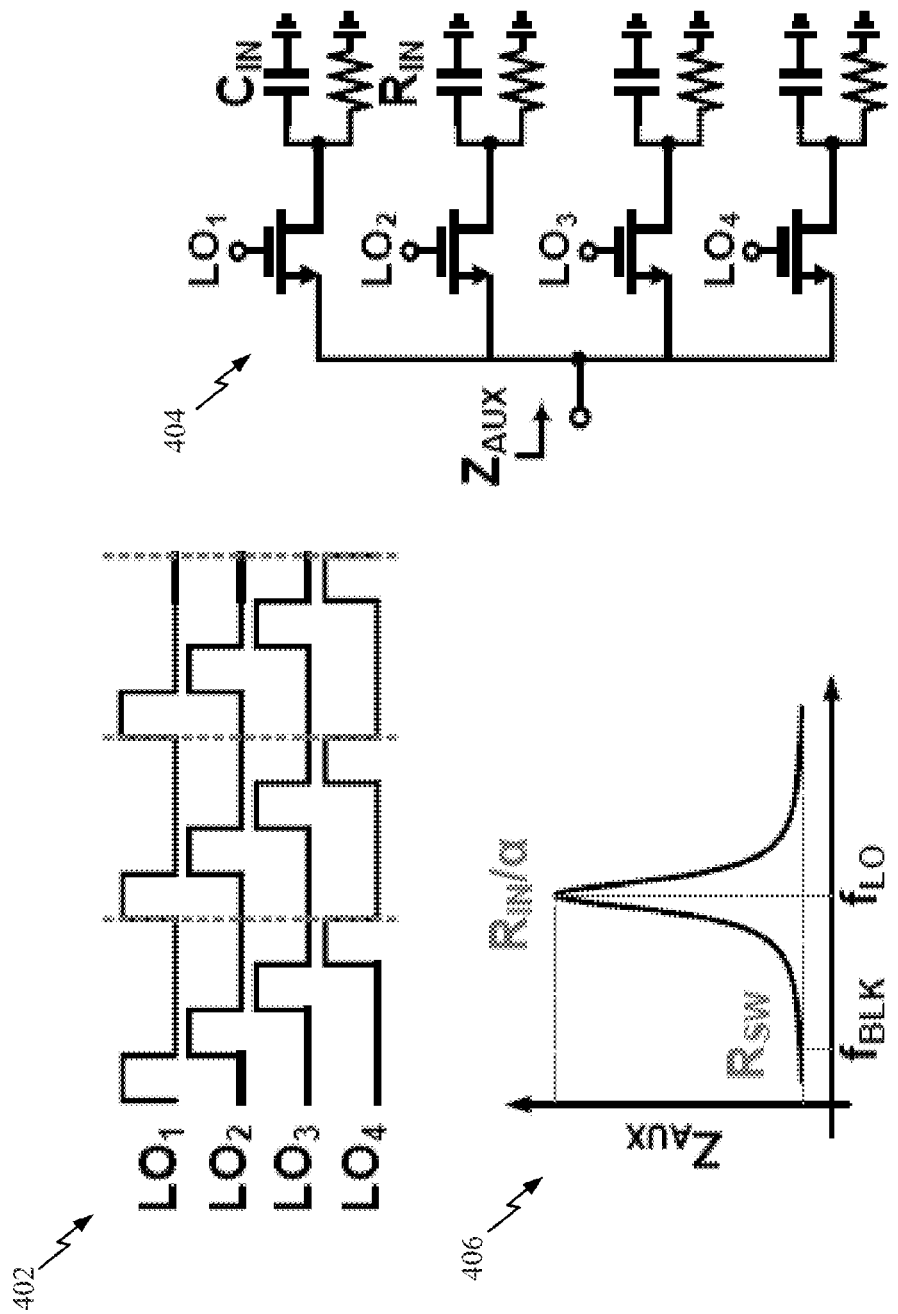
FIG. 4 illustrates a high Q factor (high-Q) N-path filter operation.

FIG. 4 illustrates diagrams 402, 404, and 406 of a high Q factor (high-Q) N-path filter operation. Referring to diagram 402, a signal generator (e.g., RX LO signal generator 286) may generate a four-phased clock or local oscillating signals $LO_1$, $LO_2$, $LO_3$, and $LO_4$. The four-phased clock or local oscillating signals $LO_1$, $LO_2$, $LO_3$, and $LO_4$ are each out of phase from each other by a multiple of 90 degrees. For example, a first local oscillating signal $LO_1$ is out of phase from a second local oscillating signal $LO_2$ by a multiple of one or ninety degrees. The first local oscillating signal $LO_1$ is out of phase from a third local oscillating signal $LO_3$ by a multiple of two or one-hundred eighty degrees. The first local oscillating signal $LO_1$ is out of phase from a third local oscillating signal $LO_4$ by a multiple of three or two-hundred seventy degrees. The four-phased half duty cycle clock or local oscillating signals $LO_1$, $LO_2$, $LO_3$, and $LO_4$ are each a square waveform.

An N-path filter is illustrated in diagram 404. The N-path filter in diagram 404 is a passive mixer with non-overlapping LO signals (e.g., $LO_1$, $LO_2$, $LO_3$, and $LO_4$) at a driver side. This allows for a very high-Q input impedance ($Z_{AUX}$) at the input of the passive mixer at the RX LO frequency. Due to reciprocal properties of the passive mixer, the input impedance of the passive mixer at an LO signal frequency ($f_{LO}$) will be an up-converted base-band load impedance. A plot of frequency versus $Z_{AUX}$ is illustrated at 406. In an example, referring to the plot 406, the input impedance $R_{IN}/\alpha$ at the LO signal frequency ($f_{LO}$) may be 50 Ohms while the swing impedance $R_{SW}$ at a blocker/jammer signal frequency ($f_{BLK}$) may be 10 Ohms. Accordingly, an amount of distortion rejected by the N-path filter may be calculated as 20 log(10/60)=15.5 dB.

In an aspect, the above-described N-path filter may be implemented at an input of the receiver to attenuate blocker/jammer signals or TX leakage. The N-path filter may be tuned to a frequency of an LO signal. Thus, the N-path filter may be tuned to a frequency equivalent to a frequency of an input signal.

Figure 5:
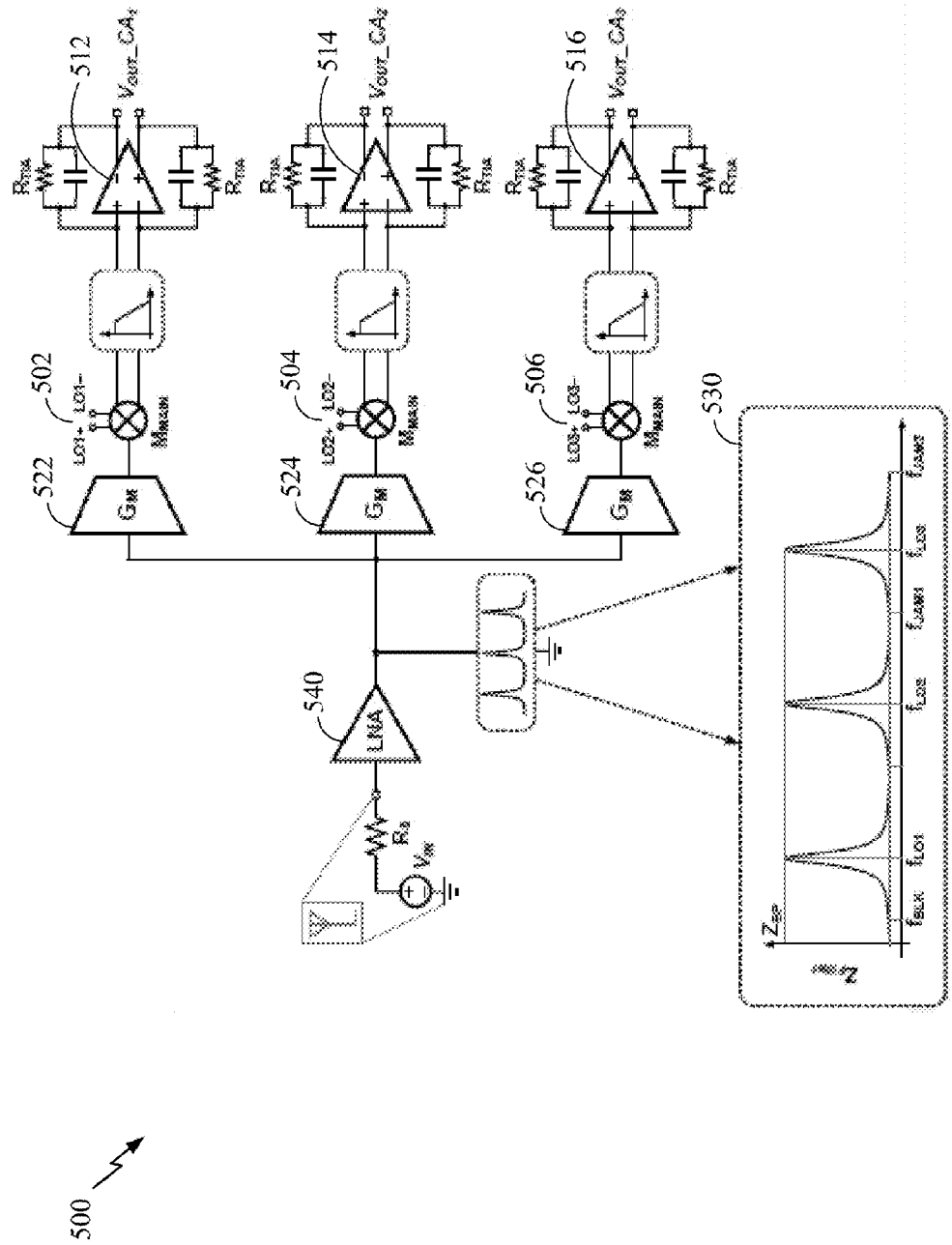
FIG. 5 is a diagram of an example filtering operation for a carrier aggregation system.

FIG. 5 is a diagram 500 of an example filtering operation for a carrier aggregation system. In the example carrier aggregation system, three different mixers are present for handling three different downlink carriers. A first mixer 502 is activated by a first LO signal LO1. A second mixer 504 is activated by a second LO signal LO2. A third mixer 503 is activated by a third LO signal LO3. An output of the first mixer 502 may be applied to a first trans-impedance amplifier 512, which outputs a first output voltage ($V_{out\_}CA_1$) for a first downlink carrier. An output of the second mixer 504 is applied to a second trans-impedance amplifier 514, which outputs a second output voltage ($V_{out\_}CA_2$) for a second downlink carrier. An output of the third mixer 506 is applied to a third trans-impedance amplifier 516, which outputs a third output voltage ($V_{out\_}CA_3$) for a third downlink carrier. A first $G_M$ stage 522 may precede the first mixer 502. A second $G_M$ stage 524 may precede the second mixer 504. A third $G_M$ stage 526 may precede the third mixer 506.

If a blocker/jammer signal exists at a frequency between a first LO signal frequency ($f_{LO1}$) and a second LO signal frequency ($f_{LO2}$), for example, then it may be difficult to filter the blocker/jammer signal with only a single N-path filter. If one N-path filter driven by the first LO signal frequency ($f_{LO1}$) is used, the one N-path filter not only attenuates the TX leakage and jammer, but also loads the other carrier signals at ($f_{LO2}$) and ($f_{LO3}$). In case multiple N-path filters, each driven by a separate LO signal, are used in parallel, each one of the filters loads the other filters. As a result, the TX leakage and jammer filtering will not be very effective. Accordingly, there is a need for an apparatus and method that provides for a plurality of high-Q bandpass filters that are tunable to a frequency of operation, wherein the filters do not attenuate any of the carrier signals, but only the TX leakage and blocker/jammer signals.

In an aspect, there is a need for a high-Q filter that produces a response with three different input impedance peaks. Referring to filter graph 530, a first input impedance peak may occur at the first LO signal frequency $f_{LO1}$, a second input impedance peak may occur at the second LO signal frequency $f_{LO2}$, and a third input impedance peak may occur at the third LO signal frequency $f_{LO3}$. The first LO signal frequency $f_{LO1}$, the second LO signal frequency $f_{LO2}$, and the third LO signal frequency $f_{LO3}$ may be tunable since an LO signal frequency of the receiver may change as a channel changes. In an aspect, three different downlink carriers may have three different LO signal frequencies. Thus, any blocker/jammer signals or TX leakage that is present between the three different LO signal frequencies may degrade receiver performance. For example, the TX leakage may make it difficult to satisfy linearity for group location tracking (GLT) systems. By employing the aforementioned high-Q filter, the TX leakage or jammer signals in between the carriers will be suppressed.

Currently, it may be difficult to attenuate TX leakage because the current filtering systems do not provide for fine filtering. In an example of fine filtering, signals may be attenuated between a first LO signal frequency ($f_{LO1}$) and a second LO signal frequency ($f_{LO2}$) or between $f_{LO2}$ and a third LO signal frequency ($f_{LO3}$). Rather, current filtering systems may perform coarse filtering, wherein signal attenuation may begin before $f_{LO1}$ and end after $f_{LO3}$, and, therefore, no filtering occurs between $f_{LO1}$ and $f_{LO2}$ or between $f_{LO2}$ and $f_{LO3}$. Referring to FIG. 5, current filtering systems allow for a single filter to be implemented at the input of the LNA 540 for all three downlink carriers. However, the current implementation of the single filter does not make fine filtering possible. Accordingly, the present disclosure provides a filter that produces the response illustrated in filter graph 530.

Figure 6:
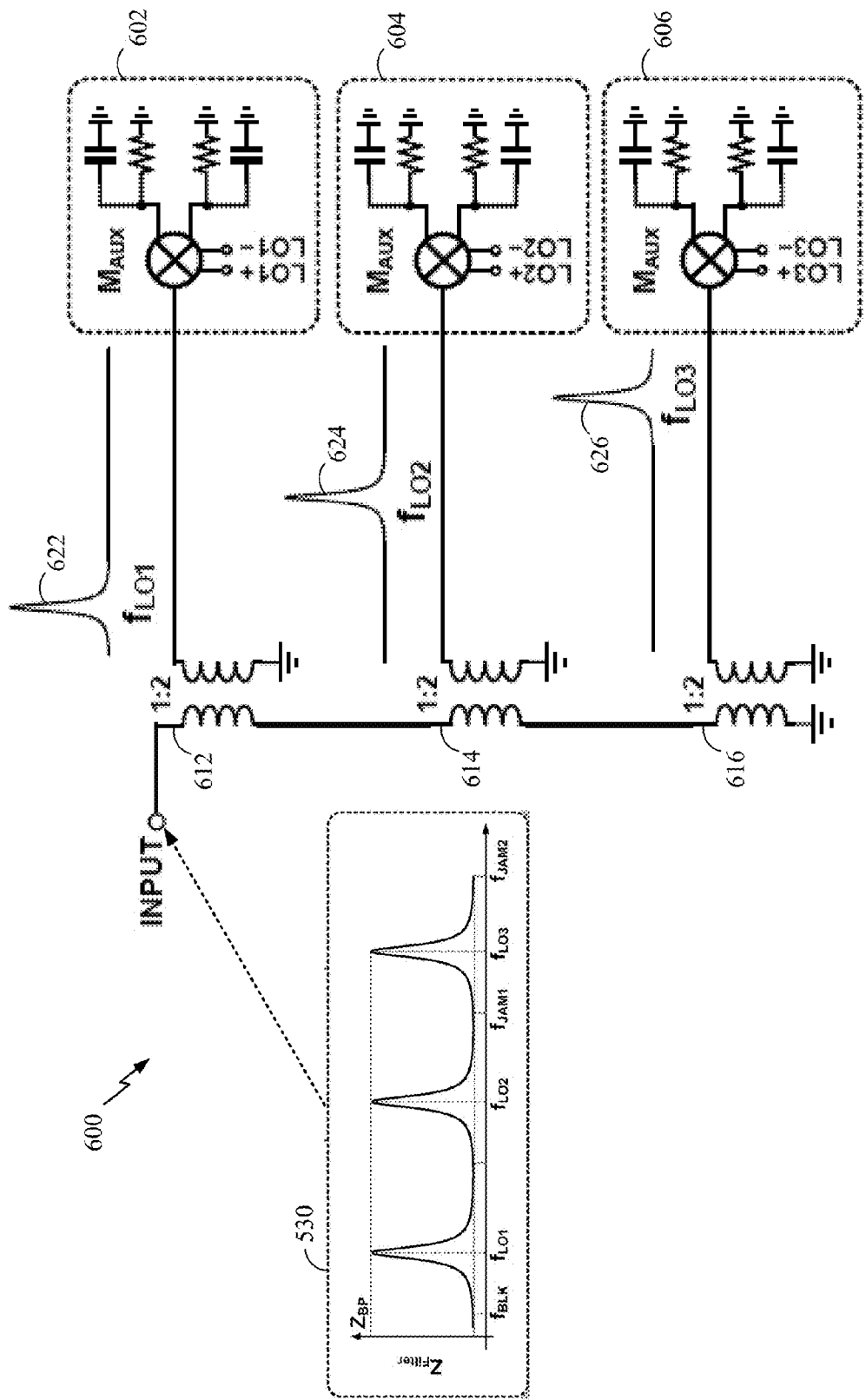
FIG. 6 illustrates a filter circuit implementing an example filtering operation.

FIG. 6 illustrates a filter circuit 600 implementing an example filtering operation. The filter circuit 600 may include three different passive mixers for handling three different downlink carriers. Each passive mixer may receive a load from an N-path filter centered at the LO frequency. A first mixer 602 is driven by a first LO signal LO1 (LO1+, LO1−). When driven, the first mixer 602 may attenuate blocker/jammer signals, TX leakage, or both in an input signal to produce a first response 622 with an input impedance peak at $f_{LO1}$. A second mixer 604 is driven by a second LO signal frequency LO2 (LO2+, LO2−). When driven, the second mixer 604 may attenuate blocker/jammer signals, TX leakage, or both, in the input signal to produce a second response 624 with an input impedance peak at $f_{LO2}$. A third mixer 606 is driven by a third LO signal frequency LO3 (LO3+, LO3−). When driven, the third mixer 606 may filter blocker/jammer signals, TX leakage, or both in the input signal to produce a third response 626 with an input impedance peak at $f_{LO3}$.

The first mixer 602 may be operatively coupled to a first transformer 612. The second mixer 604 may be operatively coupled to a second transformer 614. The third mixer 606 may be operatively coupled to a third transformer 616. In an aspect, the first mixer 602 coupled to the first transformer 612, the second mixer 604 coupled to the second transformer 614, and the third mixer 606 coupled to the third transformer 616 may operate together as an N-path filter to produce, based on the input signal, a desired total response having a high-Q input impedance.

The first mixer 602, the second mixer 604, and the third mixer 606 may be cascaded in series by cascading the first transformer 612, the second transformer 614, and the third transformer 616. By cascading the three mixers, the first response 622, the second response 624, and the third response 626 may be added together to produce a total response. Accordingly, a final filter response of the circuit 600 will have three different peaks. For example, the filtering operation produces three peaks at the three LO frequencies corresponding to respective carriers and attenuates any TX leakage and jammer signals present in between the frequencies.

In an aspect, the filtering operation described with respect to FIG. 6 may be implemented in a receiver to filter any blocker/jammer signals or TX leakage that are present prior to $f_{LO1}$ and after $f_{LO3}$, as well between $f_{LO1}$ and $f_{LO2}$, and between $f_{LO2}$ and $f_{LO3}$.

Figure 7:
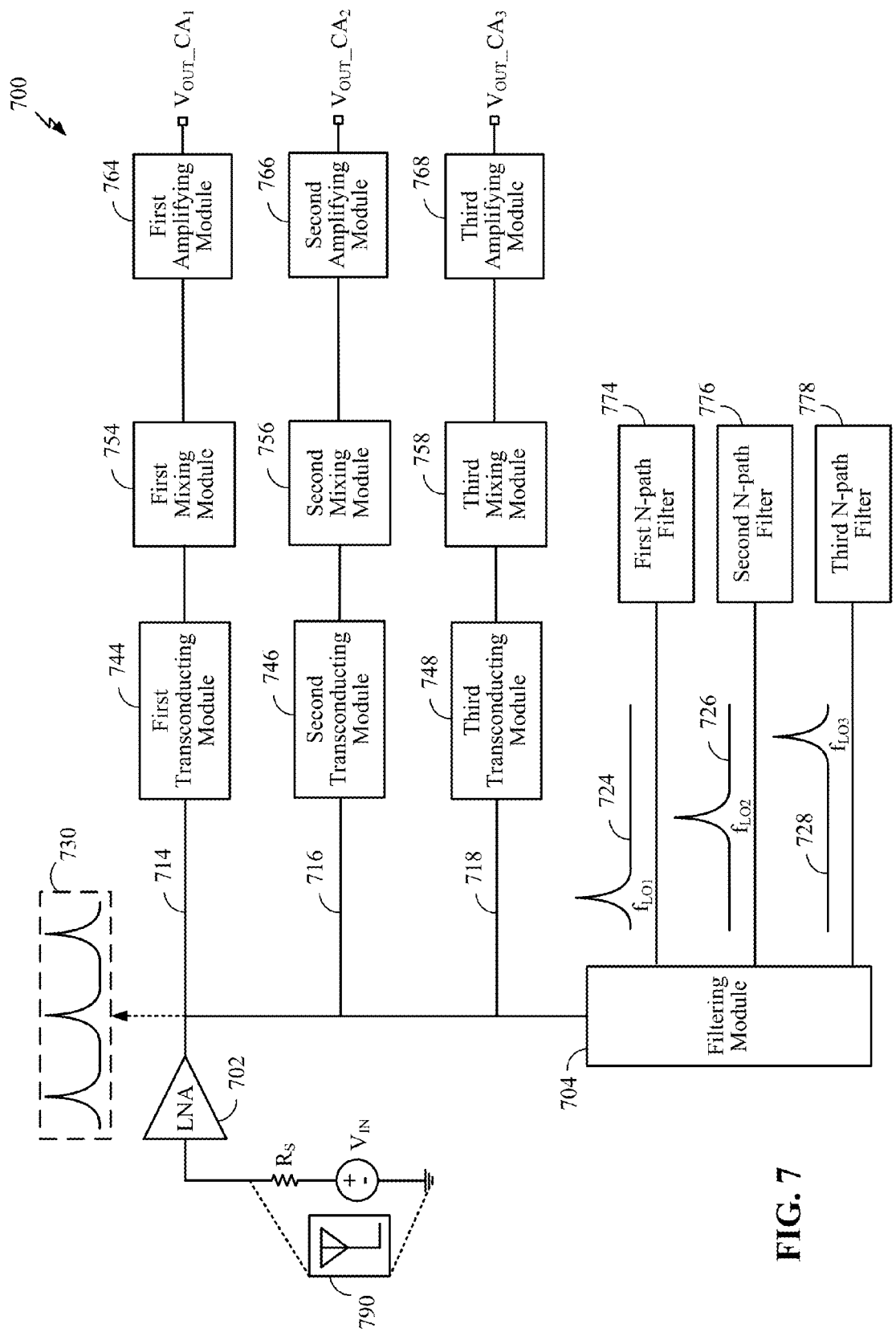
FIG. 7 is another block diagram of implementing an N-path filter in a carrier aggregation system.

FIG. 7 is a block diagram 700 of implementing an N-path filter in a carrier aggregation system. An LNA 702 is configured to receive an input signal from an antenna 790. The antenna 790 may be equivalent to the antenna 290 of FIG. 2A. The LNA 702 may receive the input signal through a duplexer/switchplexer 264 (see FIG. 2A). As illustrated in FIG. 7, the antenna 790 is depicted as a voltage source $V_{IN}$ and a resistor $R_S$ connected in series. In an example configuration, the carrier aggregation system may include three paths (e.g., paths 714, 716, and 718) for handling three downlink carriers, respectively.

In an aspect, a filtering module (e.g., N-path filter) 704 may be implemented at the output of the LNA 702 to filter blocker/jammer signals, TX leakage, or both from the input signal to produce a desired response 730 having a high-Q input impedance. The desired response 730 may be similar to the response illustrated in the filter graph 530 of FIG. 5, wherein a first input impedance peak may occur at a first LO signal frequency $f_{LO1}$, a second impedance peak may occur at a second LO signal frequency $f_{LO2}$, and a third impedance peak may occur at a third LO signal frequency $f_{LO3}$. The filtering module 704 is configured to perform fine filtering such that blocker/jammer signals, TX leakage, or both present in the input signal between the first LO signal frequency ($f_{LO1}$) and the second LO signal frequency ($f_{LO2}$), or between $f_{LO2}$ and the third LO signal frequency ($f_{LO3}$), may be attenuated. As such, the filtering module 704 may attenuate blocker/jammer signals, TX leakage (e.g., by 10 to 15 dB or greater), or both without affecting an impedance peak of the desired response 730 with respect to a particular carrier even when all three downlink carriers are active.

A first path 714 may include a first transconducting module 744 that receives an input signal from the LNA 702 and generates a current signal based on the input signal. An output of the first transconducting module 744 may be applied to a first mixing module 754 coupled to the first transconducting module 744. The first mixing module 754 is configured to shift a frequency of the current signal by mixing the current signal with a local oscillating signal (e.g., LO1) corresponding to the first path 714. An output of the first mixing module 754 may be applied to a first amplifying module 764 coupled to the first mixing module 754. The first amplifying module 764 generates a first output voltage ($V_{out}\_CA_1$) for a first downlink carrier based on the frequency-shifted signal. The first amplifying module 764 then outputs the first output voltage ($V_{out}\_CA_1$). $V_{out}\_CA_1$ may be applied to a baseband filter (e.g., RX baseband filter 260).

A second path 716 may include a second transconducting module 746 that receives an input signal from the LNA 702 and generates a current signal based on the input signal. An output of the second transconducting module 746 may be applied to a second mixing module 756 coupled to the second transconducting module 746. The second mixing module 756 is configured to shift a frequency of the current signal by mixing the current signal with a local oscillating signal (e.g., LO2) corresponding to the second path 716. An output of the second mixing module 756 may be applied to a second amplifying module 766 coupled to the second mixing module 756. The second amplifying module 766 generates a second output voltage ($V_{out}\_CA_2$) for a second downlink carrier based on the frequency-shifted signal. The second amplifying module 766 then outputs the second output voltage ($V_{out}\_CA_2$). $V_{out}\_CA_2$ may be applied to a baseband filter (e.g., RX baseband filter 260).

A third path 718 may include a third transconducting module 748 that receives an input signal from the LNA 702 and generates a current signal based on the input signal. An output of the third transconducting module 748 may be applied to a third mixing module 758 coupled to the third transconducting module 748. The third mixing module 758 is configured to shift a frequency of the current signal by mixing the current signal with a local oscillating signal (e.g., LO3) corresponding to the third path 718. An output of the third mixing module 758 may be applied to a third amplifying module 768 coupled to the third mixing module 758. The third amplifying module 768 generates a third output voltage ($V_{out}\_CA_3$) for a third downlink carrier based on the frequency-shifted signal. The third amplifying module 768 then outputs the third output voltage ($V_{out}\_CA_3$). $V_{out}\_CA_3$ may be applied to a baseband filter (e.g., RX baseband filter 260).

In an aspect, the filtering module 704 attenuates blocker/jammer signals and/or TX leakage in the input signal via use of a first N-path filter 774 to produce a first response 724 for the first path 714. The first response 724 may have an input impedance peak at $f_{LO1}$. The filtering module 704 may further attenuate blocker/jammer signals and/or TX leakage in the input signal via the use of a second N-path filter 776 to produce a second response 726 for the second path 716. The second response 726 may have an input impedance peak at $f_{LO2}$. The filtering module 704 may also attenuate blocker/jammer signals and/or TX leakage in the input signal via the use of a third N-path filter 778 to produce a third response 728 for the third path 718. The third response 728 may have an input impedance peak at $f_{LO3}$. The filtering module 704 is configured to cascade in series the first response 724, the second response 726, and the third response 728 to preserve a filtering effect. Accordingly, a sum of the first response 724, the second response 726, and the third response 728 may produce the desired response 730.

By implementing the filtering module 704, multi-carrier operation is improved, particularly when one carrier is much stronger than another carrier. For example, a noise factor (NF) of a first carrier may be severely degraded if a concurrent second carrier is much stronger and acts as a jammer with respect to the first carrier. The multi-carrier operation is improved by separating channels of the carrier aggregation system and allowing for the isolated attenuation of blocker/jammer signals and/or TX leakage on a separated channel. When a signal is received through the LNA 702, an input impedance peak of a desired response for the first path 714

(first downlink carrier) occurs at $f_{LO1}$, an input impedance peak of a desired response for the second path 716 (second downlink carrier) occurs at $f_{LO2}$, and an input impedance peak of a desired response for the third path 718 (third downlink carrier) occurs at $f_{LO3}$. Accordingly, because the desired response for the first path 714 corresponds to $f_{LO1}$, the filtering module 704 does not attenuate the input signal at $f_{LO1}$ for the first path 714. However, because the desired response for the second path 716 and the third path 718 does not correspond to $f_{LO1}$, the filtering module 704 attenuates the input signal at $f_{LO1}$ for the second path 716 and the third path 718 in order to cancel any blocker/jammer signals and/or TX leakage that may affect the desired response at $f_{LO2}$ and/or $f_{LO3}$.

The filtering module 704 may apply a similar attenuation technique to the second path 716 and the third path 718. For the second path 716, because the desired response corresponds to $f_{LO2}$, the filtering module 704 does not attenuate the input signal at $f_{LO2}$ for the second path 716. However, because the desired response for the first path 714 and the third path 718 does not correspond to $f_{LO2}$, the filtering module 704 attenuates the input signal at $f_{LO2}$ for the first path 714 and the third path 718 in order to cancel any blocker/jammer signals and/or TX leakage that may affect the desired response at $f_{LO1}$ and/or $f_{LO3}$.

For the third path 718, because the desired response corresponds to $f_{LO3}$, the filtering module 704 does not attenuate the input signal at $f_{LO3}$ for the third path 718. However, because the desired response for the first path 714 and the second path 716 does not correspond to $f_{LO3}$, the filtering module 704 attenuates the input signal at $f_{LO3}$ for the first path 714 and the second path 716 in order to cancel any blocker/jammer signals and/or TX leakage that may affect the desired response at $f_{LO1}$ and/or $f_{LO2}$.

Figure 8:
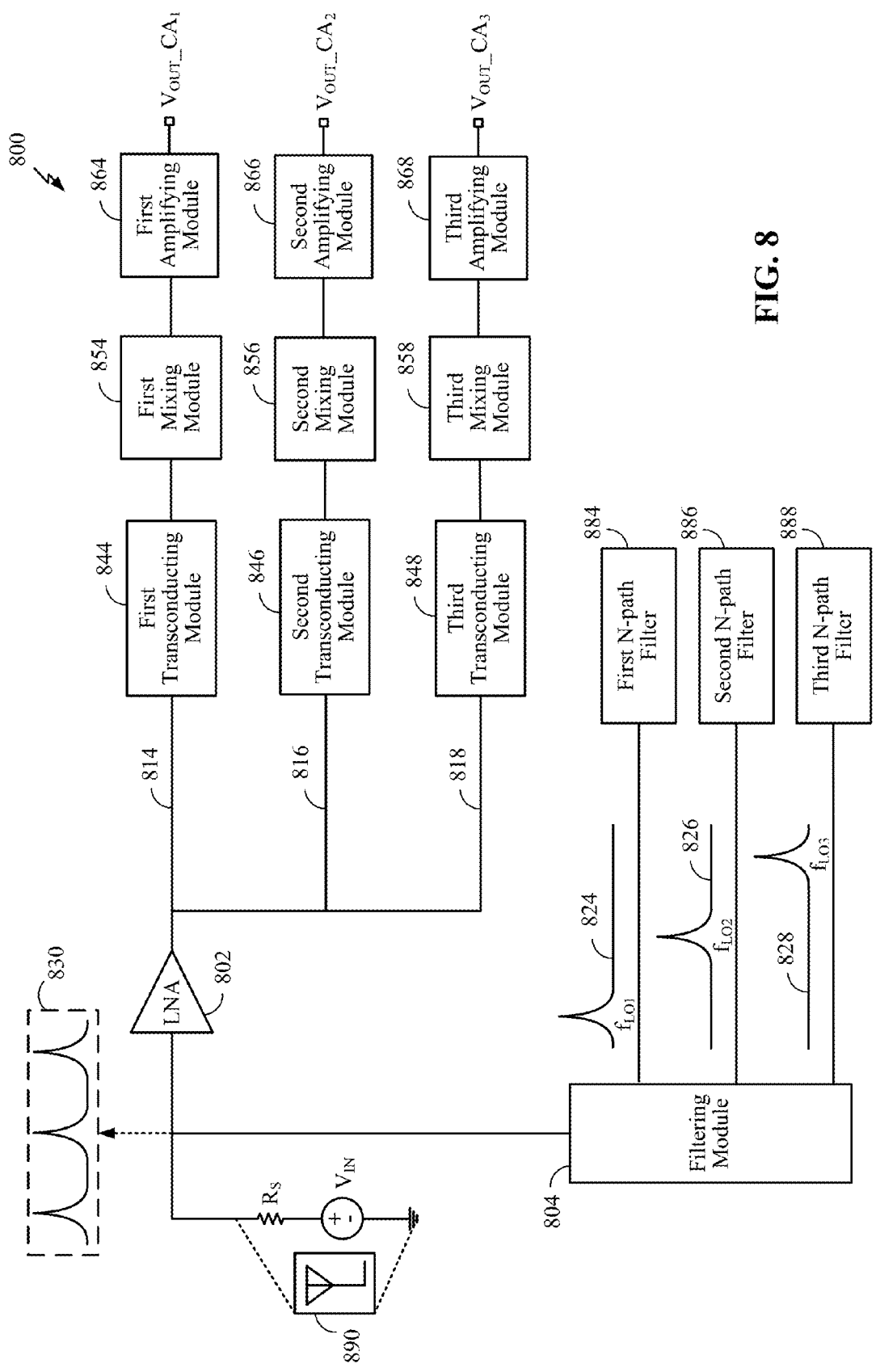
FIG. 8 is a block diagram of implementing an N-path filter in a carrier aggregation system.

FIG. 8 is a block diagram 800 of implementing an N-path filter in a carrier aggregation system. An LNA 802 is configured to receive an input signal from an antenna 890. The antenna 890 may be equivalent to the antenna 290 of FIG. 2A. The LNA 802 may receive the input signal through a duplexer/switchplexer 264 (see FIG. 2A) and/or a filtering module 804. As illustrated in FIG. 8, the antenna 890 is depicted as a voltage source $V_{IN}$ and a resistor $R_S$ connected in series. In an example configuration, the carrier aggregation system may include three paths (e.g., paths 814, 816, and 818) for handling three downlink carriers, respectively.

In an aspect, the filtering module (e.g., N-path filter) 804 may be implemented at the input/output of the LNA 802 to filter blocker/jammer signals and/or TX leakage from the input signal to produce a desired response 830 having a high-Q input impedance. The desired response 830 may be similar to the response illustrated in the filter graph 530 of FIG. 5, wherein a first input impedance peak may occur at a first LO signal frequency $f_{LO1}$, a second impedance peak may occur at a second LO signal frequency $f_{LO2}$, and a third impedance peak may occur at a third LO signal frequency $f_{LO3}$. The filtering module 804 is configured to perform fine filtering such that blocker/jammer signals and/or TX leakage present in the input signal between the first LO signal frequency ($f_{LO1}$) and the second LO signal frequency ($f_{LO2}$), or between $f_{LO2}$ and the third LO signal frequency ($f_{LO3}$), may be attenuated. As such, the filtering module 804 may attenuate blocker/jammer signals and/or TX leakage (e.g., by 10 to 15 dB or greater) without affecting an impedance peak of the desired response 830 with respect to a particular carrier even when all three downlink carriers are active.

A first path 814 may include a first transconducting module 844 that receives an input signal from the LNA 802 and generates a current signal based on the input signal. An output of the first transconducting module 844 may be applied to a first mixing module 854 coupled to the first transconducting module 844. The first mixing module 854 is configured to shift a frequency of the current signal by mixing the current signal with a local oscillating signal (e.g., LO1) corresponding to the first path 814. An output of the first mixing module 854 may be applied to a first amplifying module 864 coupled to the first mixing module 854. The first amplifying module 864 generates a first output voltage ($V_{out}\_CA_1$) for a first downlink carrier based on the frequency-shifted signal. The first amplifying module 864 then outputs the first output voltage ($V_{out}\_CA_1$). $V_{out}\_CA_1$ may be applied to a baseband filter (e.g., RX baseband filter 260).

A second path 816 may include a second transconducting module 846 that receives an input signal from the LNA 802 and generates a current signal based on the input signal. An output of the second transconducting module 846 may be applied to a second mixing module 856 coupled to the second transconducting module 846. The second mixing module 856 is configured to shift a frequency of the current signal by mixing the current signal with a local oscillating signal (e.g., LO2) corresponding to the second path 816. An output of the second mixing module 856 may be applied to a second amplifying module 866 coupled to the second mixing module 856. The second amplifying module 866 generates a second output voltage ($V_{out}\_CA_2$) for a second downlink carrier based on the frequency-shifted signal. The second amplifying module 866 then outputs the second output voltage ($V_{out}\_CA_2$). $V_{out}\_CA_2$ may be applied to a baseband filter (e.g., RX baseband filter 260).

A third path 818 may include a third transconducting module 848 that receives an input signal from the LNA 802 and generates a current signal based on the input signal. An output of the third transconducting module 848 may be applied to a third mixing module 858 coupled to the third transconducting module 848. The third mixing module 858 is configured to shift a frequency of the current signal by mixing the current signal with a local oscillating signal (e.g., LO3) corresponding to the third path 818. An output of the third mixing module 858 may be applied to a third amplifying module 868 coupled to the third mixing module 858. The third amplifying module 868 generates a third output voltage ($V_{out}\_CA_3$) for a third downlink carrier based on the frequency-shifted signal. The third amplifying module 868 then outputs the third output voltage ($V_{out}\_CA_3$). $V_{out}\_CA_3$ may be applied to a baseband filter (e.g., RX baseband filter 260).

In an aspect, the filtering module 804 attenuates blocker/jammer signals and/or TX leakage in the input signal via a first N-path filter 874 to produce a first response 824 for the first path 814. The first response 824 may have an input impedance peak at $f_{LO1}$. The filtering module 804 may further attenuate blocker/jammer signals and/or TX leakage in the input signal via a second N-path filter 876 to produce a second response 826 for the second path 816. The second response 826 may have an input impedance peak at $f_{LO2}$. The filtering module 804 may also attenuate blocker/jammer signals and/or TX leakage in the input signal via a third N-path filter 878 to produce a third response 828 for the third path 818. The third response 828 may have an input impedance peak at $f_{LO3}$. The filtering module 804 is configured to cascade in series the first response 824, the second response 826, and the third response 828 to preserve a filtering effect. Accordingly, a sum of the first response 824, the second response 826, and the third response 828 may produce the desired response 830.

By implementing the filtering module 804, multi-carrier operation is improved, particularly when one carrier is much stronger than another carrier. For example, a noise factor (NF)

of a first carrier may be severely degraded if a concurrent second carrier is much stronger and acts as a jammer with respect to the first carrier. The multi-carrier operation is improved by separating channels of the carrier aggregation system and allowing for the isolated attenuation of blocker/jammer signals and/or TX leakage on a separated channel. When a signal is received through the LNA 802, an input impedance peak of a desired response for the first path 814 (first downlink carrier) occurs at $f_{LO1}$, an input impedance peak of a desired response for the second path 816 (second downlink carrier) occurs at $f_{LO2}$, and an input impedance peak of a desired response for the third path 818 (third downlink carrier) occurs at $f_{LO3}$. Accordingly, because the desired response for the first path 814 corresponds to $f_{LO1}$, the filtering module 804 does not attenuate the input signal at $f_{LO1}$ for the first path 814. However, because the desired response for the second path 816 and the third path 818 does not correspond to $f_{LO1}$, the filtering module 804 attenuates the input signal at $f_{LO1}$ for the second path 816 and the third path 818 in order to cancel any blocker/jammer signals and/or TX leakage that may affect the desired response at $f_{LO2}$ and/or $f_{LO3}$.

The filtering module 804 may apply a similar attenuation technique to the second path 816 and the third path 818. For the second path 816, because the desired response corresponds to $f_{LO2}$, the filtering module 804 does not attenuate the input signal at $f_{LO2}$ for the second path 816. However, because the desired response for the first path 814 and the third path 818 does not correspond to $f_{LO2}$, the filtering module 804 attenuates the input signal at $f_{LO2}$ for the first path 814 and the third path 818 in order to cancel any blocker/jammer signals and/or TX leakage that may affect the desired response at $f_{LO1}$ and/or $f_{LO3}$.

For the third path 818, because the desired response corresponds to $f_{LO3}$, the filtering module 804 does not attenuate the input signal at $f_{LO3}$ for the third path 818. However, because the desired response for the first path 814 and the second path 816 does not correspond to $f_{LO3}$, the filtering module 804 attenuates the input signal at $f_{LO3}$ for the first path 814 and the second path 816 in order to cancel any blocker/jammer signals and/or TX leakage that may affect the desired response at $f_{LO1}$ and/or $f_{LO2}$.

Figure 9:
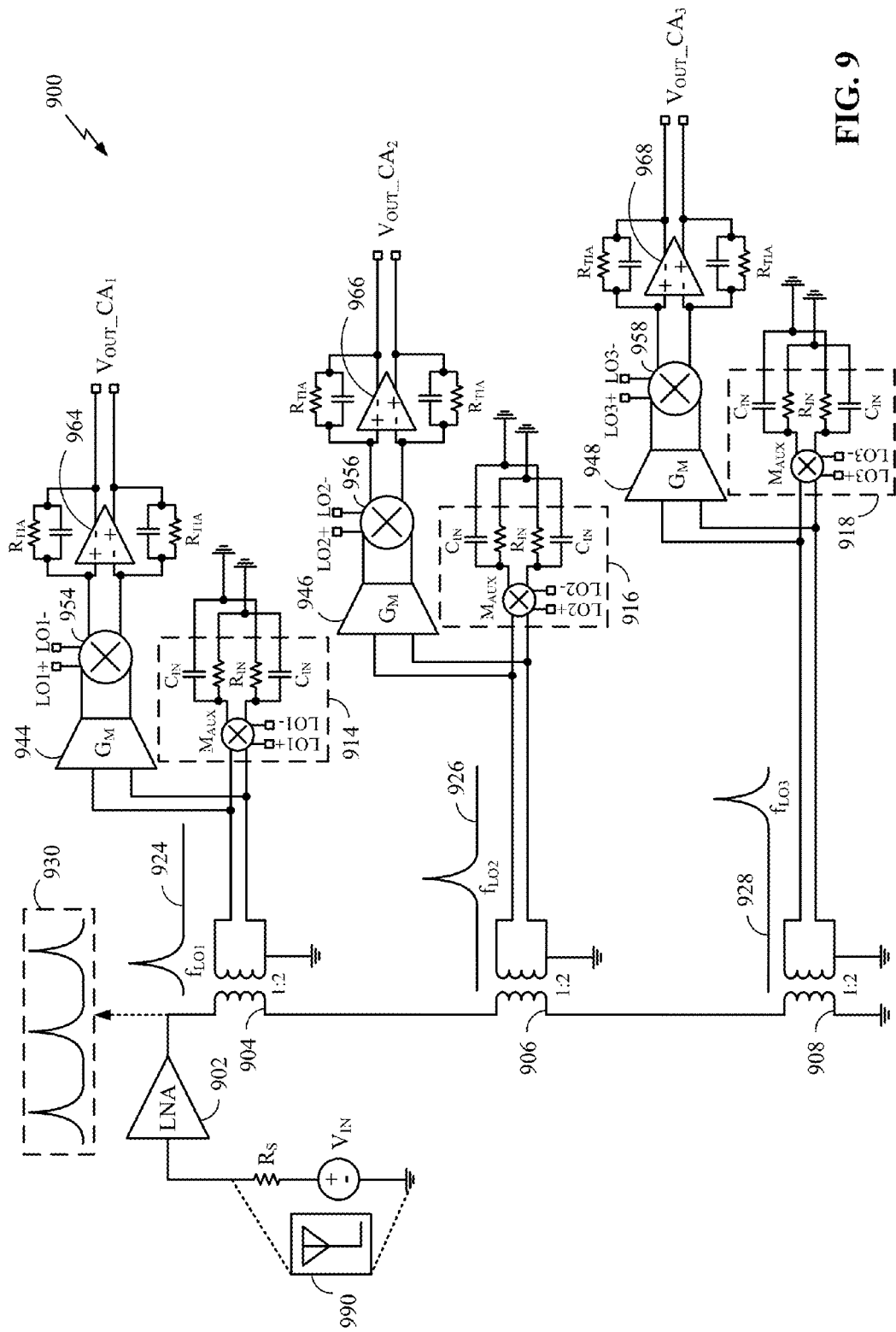
FIG. 9 is a diagram illustrating a circuit implementing an N-path filter in a carrier aggregation system of FIG. 7.

FIG. 9 is a diagram illustrating a circuit 900 implementing an N-path filter in a carrier aggregation system of FIG. 7. The circuit 900 may include an LNA 902 configured to receive an input signal from an antenna 990. The antenna 990 may be equivalent to the antenna 290 of FIG. 2A. The LNA 902 may receive the input signal through a duplexer/switchplexer 264 (see FIG. 2A). As illustrated in FIG. 9, the antenna 990 is depicted as a voltage source $V_{IN}$ and a resistor $R_S$ connected in series. In an example configuration, the circuit 900 may include three circuit paths for handling three downlink carriers, respectively.

In an aspect, the circuit 900 may implement an N-path filter at the output of the LNA 902 to filter blocker/jammer signals and/or TX leakage and produce a desired response 930 having a high-Q input impedance (desired response 930). The N-path filter may operate similarly to the filtering module 704 of FIG. 7. The desired response 930 may be similar to the response illustrated in the filter graph 530 of FIG. 5, wherein a first input impedance peak may occur at a first LO signal frequency $f_{LO1}$, a second impedance peak may occur at a second LO signal frequency $f_{LO2}$, and a third impedance peak may occur at a third LO signal frequency $f_{LO3}$. The N-path filter is configured to perform fine filtering such that blocker/jammer signals and/or TX leakage present in the input signal between the first LO signal frequency ($f_{LO1}$) and the second LO signal frequency ($f_{LO2}$), or between $f_{LO2}$ and the third LO signal frequency ($f_{LO3}$), may be attenuated. As such, the N-path filter may attenuate blocker/jammer signals and/or TX leakage (e.g., by 10 to 15 dB or greater) without affecting an input impedance of the desired response 1130 with respect to a particular carrier even when all three downlink carriers are active.

A first circuit path may include a first $G_M$ stage 944 that receives an input signal from the LNA 902 and generates a current signal based on the input signal. An output of the first $G_M$ stage 944 may be applied to a first mixer 954 coupled to the first $G_M$ stage 944. The first mixer 954 is activated by a first LO signal LO1 (LO1+, LO1−). As such, the first mixer 954 is configured to shift a frequency of the current signal by mixing the current signal with LO1. An output of the first mixer 954 may be applied to a first amplifier 964 coupled to the first mixer 954. The first amplifier 964 generates a first output voltage ($V_{out\_}CA_1$) for a first downlink carrier based on the frequency-shifted signal. The first amplifier 964 then outputs the first output voltage ($V_{out\_}CA_1$). $V_{out\_}CA_1$ may be applied to a baseband filter (e.g., RX baseband filter 260). The first $G_M$ stage 944, the first mixer 954, and the first amplifier 964 may be equivalent to the first transconducting module 1344, the first mixing module 1354, and the first amplifying module 1364, respectively.

A second circuit path may include a second $G_M$ stage 946 that receives an input signal from the LNA 902 and generates a current signal based on the input signal. An output of the second $G_M$ stage 946 may be applied to a second mixer 956 coupled to the second $G_M$ stage 946. The second mixer 956 is activated by a second LO signal LO2 (LO2+, LO2−). As such, the second mixer 956 is configured to shift a frequency of the current signal by mixing the current signal with LO2. An output of the second mixer 956 may be applied to a second amplifier 966 coupled to the second mixer 956. The second amplifier 966 generates a second output voltage ($V_{out\_}CA_2$) for a second downlink carrier based on the frequency-shifted signal. The second amplifier 966 then outputs the second output voltage ($V_{out\_}CA_2$). $V_{out\_}CA_2$ may be applied to a baseband filter (e.g., RX baseband filter 260). The second $G_M$ stage 946, the second mixer 956, and the second amplifier 966 may be equivalent to the second transconducting module 1346, the second mixing module 1356, and the second amplifying module 1366, respectively.

A third circuit path may include a third $G_M$ stage 948 that receives an input signal from the LNA 902 and generates a current signal based on the input signal. An output of the third $G_M$ stage 948 may be applied to a third mixer 958 coupled to the third $G_M$ stage 948. The third mixer 958 is activated by a third LO signal LO3 (LO3+, LO3−). As such, the third mixer 958 is configured to shift a frequency of the current signal by mixing the current signal with LO3. An output of the third mixer 958 may be applied to a third amplifier 968 coupled to the third mixer 968. The third amplifier 968 generates a third output voltage ($V_{out\_}CA_3$) for a third downlink carrier based on the frequency-shifted signal. The third amplifier 968 then outputs the third output voltage ($V_{out\_}CA_3$). $V_{out\_}CA_3$ may be applied to a baseband filter (e.g., RX baseband filter 260). The third $G_M$ stage 948, the third mixer 958, and the third amplifier 968 may be equivalent to the third transconducting module 1348, the third mixing module 1358, and the third amplifying module 1368, respectively.

In an aspect, the N-path filter is configured to attenuate blocker/jammer signals and/or TX leakage in the input signal to generate a first response 924 for the first circuit path. The first response 924 may have an input impedance peak at $f_{LO1}$. The N-path filter is further configured to attenuate blocker/jammer signals and/or TX leakage in the input signal to generate a second response 926 for the second circuit path. The second response 926 may have an input impedance peak at $f_{LO2}$. The N-path filter is also configured to attenuate blocker/jammer signals and/or TX leakage in the input signal to generate a third response 928 for the third circuit path. The third response 928 may have an input impedance peak at $f_{LO3}$. The N-path filter cascades in series the first response 924, the second response 926, and the third response 928 to preserve a filtering effect. A sum of the first response 924, the second response 926, and the third response 928 may produce the desired response 930.

The N-path filter may include a first auxiliary mixer ($M_{AUX}$) 914 for the first circuit path, a second auxiliary mixer ($M_{AUX}$) 916 for the second circuit path, and a third auxiliary mixer ($M_{AUX}$) 918 for the third circuit path. The N-path filter may further include a first transformer 904 operatively coupled to the first $M_{AUX}$ 914, a second transformer 906 operatively coupled to the second $M_{AUX}$ 916, and a third transformer 908 operatively coupled to the third $M_{AUX}$ 918.

The first $M_{AUX}$ 914 is driven by LO1 (LO1+, LO1−). When driven, the first $M_{AUX}$ 914 may attenuate blocker/jammer signals and/or TX leakage in the input signal received from the LNA 902 (via the first transformer 904) to produce the first response 924 having the input impedance peak at $f_{LO1}$. The second $M_{AUX}$ 916 is driven by LO2 (LO2+, LO2−). When driven, the second $M_{AUX}$ 916 may attenuate blocker/jammer signals and/or TX leakage in the input signal received from the LNA 902 (via the second transformer 906) to produce the second response 926 having the input impedance peak at $f_{LO2}$. The third $M_{AUX}$ 918 is driven by LO3 (LO3+, LO3−). When driven, the third $M_{AUX}$ 918 may attenuate blocker/jammer signals and/or TX leakage in the input signal received from the LNA 902 (via the third transformer 908) to produce the third response 928 having the input impedance peak at $f_{LO3}$.

The first $M_{AUX}$ 914, the second $M_{AUX}$ 916, and the third $M_{AUX}$ 918 may be cascaded in series by cascading the first transformer 904, the second transformer 906, and the third transformer 908. According to the cascaded configuration, a sum of the first response 924, the second response 926, and the third response 928 produces the desired response 930.

By implementing the N-path filter, multi-carrier operation is improved, particularly when one carrier is much stronger than another carrier. For example, a noise factor (NF) of a first carrier may be severely degraded if a concurrent second carrier is much stronger and acts as a jammer with respect to the first carrier. The multi-carrier operation is improved by separating channels of the carrier aggregation system and allowing for the isolated attenuation of blocker/jammer signals and/or TX leakage on a separated channel. When a signal is received through the LNA 902, an input impedance peak of a desired response for the first circuit path (first downlink carrier) occurs at $f_{LO1}$, an input impedance peak of a desired response for the second circuit path (second downlink carrier) occurs at $f_{LO2}$, and an input impedance peak of a desired response for the third circuit path (third downlink carrier) occurs at $f_{LO3}$. Accordingly, because the desired response for the first circuit path corresponds to $f_{LO1}$, the N-path filter does not attenuate the input signal at $f_{LO1}$ for the first circuit path. However, because the desired response for the second circuit path and the third circuit path does not correspond to $f_{LO1}$, the N-path filter attenuates the input signal at $f_{LO1}$ for the second circuit path and the third circuit path in order to cancel any blocker/jammer signals and/or TX leakage that may affect the desired response at $f_{LO2}$ and/or $f_{LO3}$.

The N-path filter may apply a similar attenuation technique to the second circuit path and the third circuit path. For the second circuit path, because the desired response corresponds to $f_{LO2}$, the N-path filter does not attenuate the input signal at $f_{LO2}$ for the second circuit path. However, because the desired response for the first circuit path and the third circuit path does not correspond to $f_{LO2}$, the N-path filter attenuates the input signal at $f_{LO2}$ for the first circuit path and the third circuit path in order to cancel any blocker/jammer signals and/or TX leakage that may affect the desired response at $f_{LO1}$ and/or $f_{LO3}$.

For the third circuit path, because the desired response corresponds to $f_{LO3}$, the N-path filter does not attenuate the input signal at $f_{LO3}$ for the third circuit path. However, because the desired response for the first circuit path and the second circuit path does not correspond to $f_{LO3}$, the N-path filter attenuates the input signal at $f_{LO3}$ for the first circuit path and the second circuit path in order to cancel any blocker/jammer signals and/or TX leakage that may affect the desired response at $f_{LO1}$ and/or $f_{LO2}$.

As illustrated FIG. 9, an output of the first transformer 904 is coupled to an input of the first $G_M$ stage 944, an output of the second transformer 906 is coupled to an input of the second $G_M$ stage 946, and an output of the third transformer 908 is coupled to an input of the third $G_M$ stage 948. However, other configurations of the N-path filter are contemplated in accordance with the present disclosure. In an example configuration, the input of the first $G_M$ stage 944, the input of the second $G_M$ stage 946, and the input of the third $G_M$ stage 948 is not coupled to the output of the first transformer 904, the output of the second transformer 906, and the output of the third transformer 908, respectively. Rather, the input of the first $G_M$ stage 944, the input of the second $G_M$ stage 946, and the input of the third $G_M$ stage 948 is directly coupled to the output of the LNA 902. Furthermore, in the example configuration, an additional transformer may be coupled between the first $G_M$ stage 944 and the first mixer 954, between the second $G_M$ stage 946 and the second mixer 956, and between the third $G_M$ stage 948 and the third mixer 958.

Figure 10:
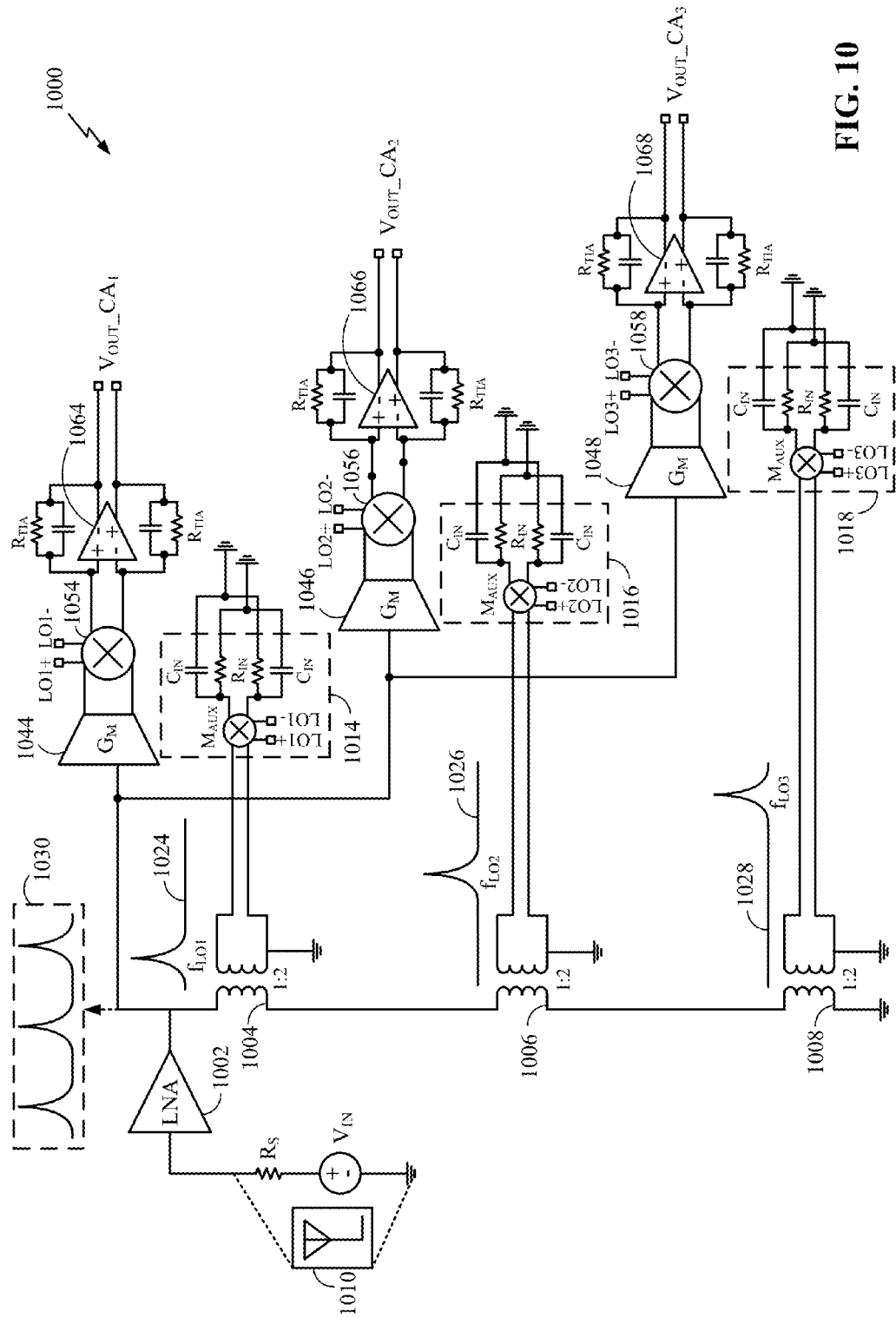
FIG. 10 is a diagram illustrating a circuit implementing an N-path filter in a carrier aggregation system of FIG. 8.

FIG. 10 is a diagram illustrating a circuit 1000 implementing an N-path filter in a carrier aggregation system of FIG. 8. The circuit 1000 may include an LNA 1002 configured to receive an input signal from an antenna 1090. The antenna 1090 may be equivalent to the antenna 290 of FIG. 2A. The LNA 1002 may receive the input signal through a duplexer/switchplexer 264 (see FIG. 2A). As illustrated in FIG. 10, the antenna 1090 is depicted as a voltage source $V_{IN}$ and a resistor $R_S$ connected in series. In an example configuration, the circuit 1000 may include three circuit paths for handling three downlink carriers, respectively.

In an aspect, the circuit 1000 may implement an N-path filter at the output of the LNA 1002 to filter blocker/jammer signals and/or TX leakage and produce a desired response 1030 having a high-Q input impedance (desired response 1030). The N-path filter may operate similarly to the filtering module 804 of FIG. 8. The desired response 1030 may be similar to the response illustrated in the filter graph 530 of FIG. 5, wherein a first input impedance peak may occur at a first LO signal frequency $f_{LO1}$, a second impedance peak may occur at a second LO signal frequency $f_{LO2}$, and a third impedance peak may occur at a third LO signal frequency $f_{LO3}$. The N-path filter is configured to perform fine filtering such that blocker/jammer signals and/or TX leakage present in the input signal between the first LO signal frequency ($f_{LO1}$) and the second LO signal frequency ($f_{LO2}$), or between $f_{LO2}$ and the third LO signal frequency ($f_{LO3}$), may be attenuated. As such, the N-path filter may attenuate blocker/jammer signals and/or TX leakage (e.g., by 10 to 15 dB or greater)

without affecting an input impedance of the desired response 1030 with respect to a particular carrier even when all three downlink carriers are active.

A first circuit path may include a first $G_M$ stage 1044 that receives an input signal from the LNA 1002 and generates a current signal based on the input signal. An output of the first $G_M$ stage 1044 may be applied to a first mixer 1054 coupled to the first $G_M$ stage 1044. The first mixer 1054 is activated by a first LO signal LO1 (LO1+, LO1−). As such, the first mixer 1054 is configured to shift a frequency of the current signal by mixing the current signal with LO1. An output of the first mixer 1054 may be applied to a first amplifier 1064 coupled to the first mixer 1054. The first amplifier 1064 generates a first output voltage ($V_{out\_}CA_1$) for a first downlink carrier based on the frequency-shifted signal. The first amplifier 1064 then outputs the first output voltage ($V_{out\_}CA_1$). $V_{out\_}CA_1$ may be applied to a baseband filter (e.g., RX baseband filter 260). The first $G_M$ stage 1044, the first mixer 1054, and the first amplifier 1064 may be equivalent to the first transconducting module 844, the first mixing module 854, and the first amplifying module 864, respectively.

A second circuit path may include a second $G_M$ stage 1046 that receives an input signal from the LNA 1002 and generates a current signal based on the input signal. An output of the second $G_M$ stage 1046 may be applied to a second mixer 1056 coupled to the second $G_M$ stage 1046. The second mixer 1056 is activated by a second LO signal LO2 (LO2+, LO2−). As such, the second mixer 1056 is configured to shift a frequency of the current signal by mixing the current signal with LO2. An output of the second mixer 1056 may be applied to a second amplifier 1066 coupled to the second mixer 1056. The second amplifier 1066 generates a second output voltage ($V_{out\_}CA_2$) for a second downlink carrier based on the frequency-shifted signal. The second amplifier 1066 then outputs the second output voltage ($V_{out\_}CA_2$). $V_{out\_}CA_2$ may be applied to a baseband filter (e.g., RX baseband filter 260). The second $G_M$ stage 1046, the second mixer 1056, and the second amplifier 1066 may be equivalent to the second transconducting module 846, the second mixing module 856, and the second amplifying module 866, respectively.

A third circuit path may include a third $G_M$ stage 1048 that receives an input signal from the LNA 1002 and generates a current signal based on the input signal. An output of the third $G_M$ stage 1048 may be applied to a third mixer 1058 coupled to the third $G_M$ stage 1048. The third mixer 1058 is activated by a third LO signal LO3 (LO3+, LO3−). As such, the third mixer 1058 is configured to shift a frequency of the current signal by mixing the current signal with LO3. An output of the third mixer 1058 may be applied to a third amplifier 1068 coupled to the third mixer 1058. The third amplifier 1068 generates a third output voltage ($V_{out\_}CA_3$) for a third downlink carrier based on the frequency-shifted signal. The third amplifier 1068 then outputs the third output voltage ($V_{out\_}CA_3$). $V_{out\_}CA_3$ may be applied to a baseband filter (e.g., RX baseband filter 260). The third $G_M$ stage 1048, the third mixer 1058, and the third amplifier 1068 may be equivalent to the third transconducting module 848, the third mixing module 858, and the third amplifying module 868, respectively.

In an aspect, the N-path filter is configured to attenuate blocker/jammer signals and/or TX leakage in the input signal to generate a first response 1024 for the first circuit path. The first response 1024 may have an input impedance peak at $f_{LO1}$. The N-path filter is further configured to attenuate blocker/jammer signals and/or TX leakage in the input signal to generate a second response 1026 for the second circuit path. The second response 1026 may have an input impedance peak at $f_{LO2}$. The N-path filter is also configured to attenuate blocker/jammer signals and/or TX leakage in the input signal to generate a third response 1028 for the third circuit path. The third response 1028 may have an input impedance peak at $f_{LO3}$. The N-path filter cascades in series the first response 1024, the second response 1026, and the third response 1028 to preserve a filtering effect. A sum of the first response 1024, the second response 1026, and the third response 1028 may produce the desired response 1030.

The N-path filter may include a first auxiliary mixer ($M_{AUX}$) 1014 for the first circuit path, a second auxiliary mixer ($M_{AUX}$) 1016 for the second circuit path, and a third auxiliary mixer ($M_{AUX}$) 1018 for the third circuit path. The N-path filter may further include a first transformer 1004 operatively coupled to the first $M_{AUX}$ 1014, a second transformer 1006 operatively coupled to the second $M_{AUX}$ 1016, and a third transformer 1008 operatively coupled to the third $M_{AUX}$ 1018.

The first $M_{AUX}$ 1014 is driven by LO1 (LO1+, LO1−). When driven, the first $M_{AUX}$ 1014 may attenuate blocker/jammer signals and/or TX leakage in the input signal received from the LNA 1002 (via the first transformer 1004) to produce the first response 1024 having the input impedance peak at $f_{LO1}$. The second $M_{AUX}$ 1016 is driven by LO2 (LO2+, LO2−). When driven, the second $M_{AUX}$ 1016 may attenuate blocker/jammer signals and/or TX leakage in the input signal received from the LNA 1002 (via the second transformer 1006) to produce the second response 1026 having the input impedance peak at $f_{LO2}$. The third $M_{AUX}$ 1018 is driven by LO3 (LO3+, LO3−). When driven, the third $M_{AUX}$ 1018 may attenuate blocker/jammer signals and/or TX leakage in the input signal received from the LNA 1002 (via the third transformer 1008) to produce the third response 1028 having the input impedance peak at $f_{LO3}$.

The first $M_{AUX}$ 1014, the second $M_{AUX}$ 1016, and the third $M_{AUX}$ 1018 may be cascaded in series by cascading the first transformer 1004, the second transformer 1006, and the third transformer 1008. According to the cascaded configuration, a sum of the first response 1024, the second response 1026, and the third response 1028 produces the desired response 1030.

By implementing the N-path filter, multi-carrier operation is improved, particularly when one carrier is much stronger than another carrier. For example, a noise factor (NF) of a first carrier may be severely degraded if a concurrent second carrier is much stronger and acts as a jammer with respect to the first carrier. The multi-carrier operation is improved by separating channels of the carrier aggregation system and allowing for the isolated attenuation of blocker/jammer signals and/or TX leakage on a separated channel. When a signal is received through the LNA 1002, an input impedance peak of a desired response for the first circuit path (first downlink carrier) occurs at $f_{LO1}$, an input impedance peak of a desired response for the second circuit path (second downlink carrier) occurs at $f_{LO2}$, and an input impedance peak of a desired response for the third circuit path (third downlink carrier) occurs at $f_{LO3}$. Accordingly, because the desired response for the first circuit path corresponds to $f_{LO1}$, the N-path filter does not attenuate the input signal at $f_{LO1}$ for the first circuit path. However, because the desired response for the second circuit path and the third circuit path does not correspond to $f_{LO1}$, the N-path filter attenuates the input signal at $f_{LO1}$ for the second circuit path and the third circuit path in order to cancel any blocker/jammer signals and/or TX leakage that may affect the desired response at $f_{LO2}$ and/or $f_{LO3}$.

The N-path filter may apply a similar attenuation technique to the second circuit path and the third circuit path. For the second circuit path, because the desired response corresponds to $f_{LO2}$, the N-path filter does not attenuate the input signal at $f_{LO2}$ for the second circuit path. However, because the desired response for the first circuit path and the third circuit path does not correspond to $f_{LO2}$, the N-path filter attenuates the input signal at $f_{LO2}$ for the first circuit path and the third circuit path in order to cancel any blocker/jammer signals and/or TX leakage that may affect the desired response at $f_{LO1}$ and/or $f_{LO3}$.

For the third circuit path, because the desired response corresponds to $f_{LO3}$, the N-path filter does not attenuate the input signal at $f_{LO3}$ for the third circuit path. However, because the desired response for the first circuit path and the second circuit path does not correspond to $f_{LO3}$, the N-path filter attenuates the input signal at $f_{LO3}$ for the first circuit path and the second circuit path in order to cancel any blocker/jammer signals and/or TX leakage that may affect the desired response at $f_{LO1}$ and/or $f_{LO2}$.

As illustrated in FIG. 10, the input of the first $G_M$ stage 1044, the input of the second $G_M$ stage 1046, and the input of the third $G_M$ stage 1048 is directly coupled to the output of the LNA 1002. In an example configuration, an additional transformer may be coupled between the first $G_M$ stage 1044 and the first mixer 1054, between the second $G_M$ stage 1046 and the second mixer 1056, and between the third $G_M$ stage 1048 and the third mixer 1058.

Figure 11:
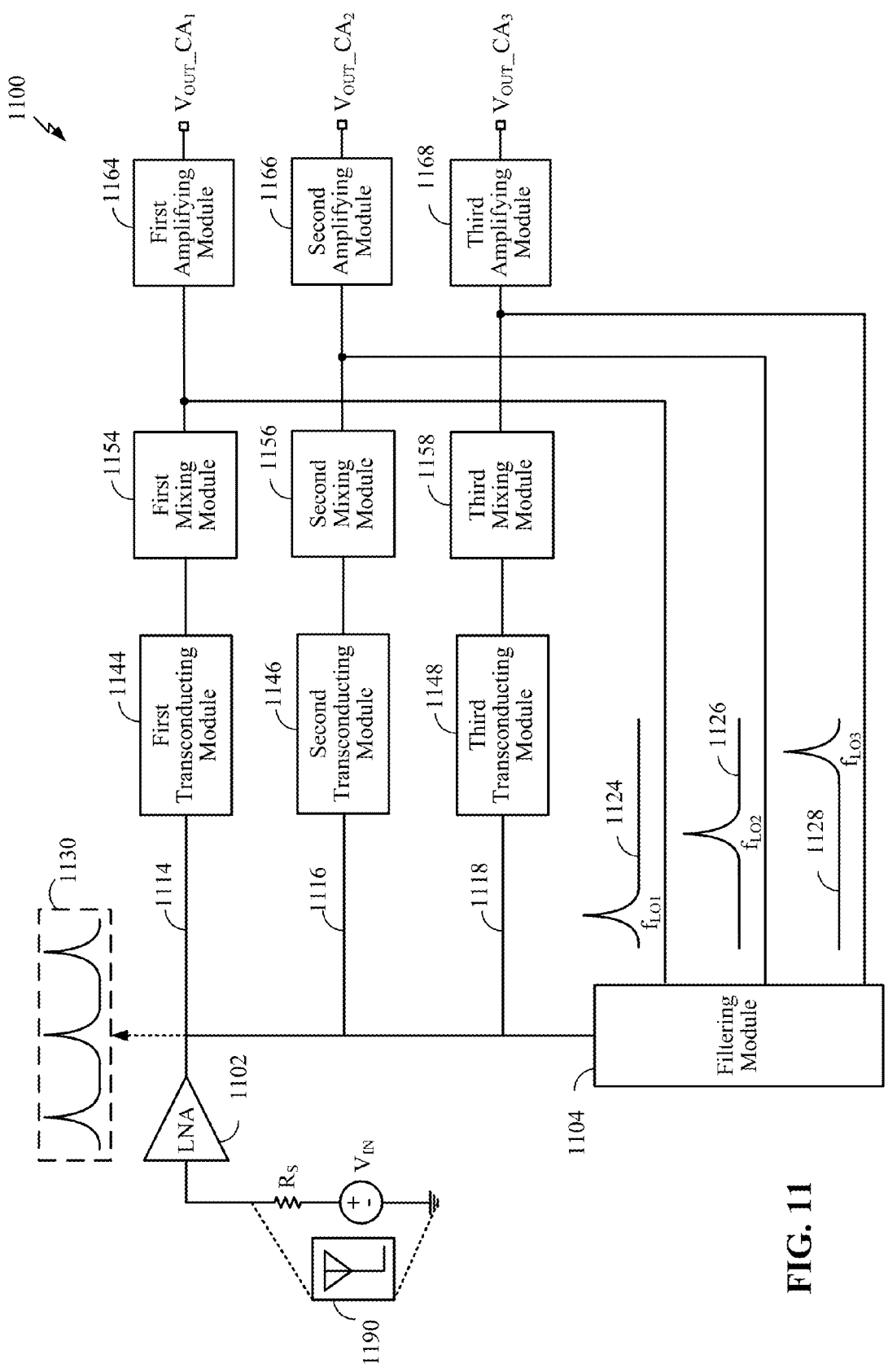
FIG. 11 is a block diagram of implementing an N-path filter in a carrier aggregation system.

FIG. 11 is a block diagram 1100 of implementing an N-path filter in a carrier aggregation system. An LNA 1102 is configured to receive an input signal from an antenna 1190. The antenna 1190 may be equivalent to the antenna 290 of FIG. 2A. The LNA 1102 may receive the input signal through a duplexer/switchplexer 264 (see FIG. 2A). As illustrated in FIG. 11, the antenna 1190 is depicted as a voltage source $V_{IN}$ and a resistor $R_S$ connected in series. In an example configuration, the carrier aggregation system may include three paths (e.g., paths 1114, 1116, and 1118) for handling three downlink carriers, respectively.

In an aspect, a filtering module (e.g., N-path filter) 1104 may be implemented at the output of the LNA 1102 to filter blocker/jammer signals and/or TX leakage from the input signal to produce a desired response 1130 having a high-Q input impedance. The desired response 1130 may be similar to the response illustrated in the filter graph 530 of FIG. 5, wherein a first input impedance peak may occur at a first LO signal frequency $f_{LO1}$, a second impedance peak may occur at a second LO signal frequency $f_{LO2}$, and a third impedance peak may occur at a third LO signal frequency $f_{LO3}$. The filtering module 1104 is configured to perform fine filtering such that blocker/jammer signals and/or TX leakage present in the input signal between the first LO signal frequency ($f_{LO1}$) and the second LO signal frequency ($f_{LO2}$), or between $f_{LO2}$ and the third LO signal frequency ($f_{LO3}$), may be attenuated. As such, the filtering module 1104 may attenuate blocker/jammer signals and/or TX leakage (e.g., by 10 to 15 dB or greater) without affecting an impedance peak of the desired response 1130 with respect to a particular carrier even when all three downlink carriers are active.

A first path 1114 may include a first transconducting module 1144 that receives an input signal from the LNA 1102 and generates a current signal based on the input signal. An output of the first transconducting module 1144 may be applied to a first mixing module 1154 coupled to the first transconducting module 1144. The first mixing module 1154 is configured to shift a frequency of the current signal by mixing the current signal with a local oscillating signal (e.g., LO1) corresponding to the first path 1114. An output of the first mixing module 1154 may be applied to a first amplifying module 1164 coupled to the first mixing module 1154. The first amplifying module 1164 generates a first output voltage ($V_{out}\_CA_1$) for a first downlink carrier based on the frequency-shifted signal. The first amplifying module 1164 then outputs the first output voltage ($V_{out}\_CA_1$). $V_{out}\_CA_1$ may be applied to a baseband filter (e.g., RX baseband filter 260).

A second path 1116 may include a second transconducting module 1146 that receives an input signal from the LNA 1102 and generates a current signal based on the input signal. An output of the second transconducting module 1146 may be applied to a second mixing module 1156 coupled to the second transconducting module 1146. The second mixing module 1156 is configured to shift a frequency of the current signal by mixing the current signal with a local oscillating signal (e.g., LO2) corresponding to the second path 1116. An output of the second mixing module 1156 may be applied to a second amplifying module 1166 coupled to the second mixing module 1156. The second amplifying module 1166 generates a second output voltage ($V_{out}\_CA_2$) for a second downlink carrier based on the frequency-shifted signal. The second amplifying module 1166 then outputs the second output voltage ($V_{out}\_CA_2$). $V_{out}\_CA_2$ may be applied to a baseband filter (e.g., RX baseband filter 260).

A third path 1118 may include a third transconducting module 1148 that receives an input signal from the LNA 1102 and generates a current signal based on the input signal. An output of the third transconducting module 1148 may be applied to a third mixing module 1158 coupled to the third transconducting module 1148. The third mixing module 1158 is configured to shift a frequency of the current signal by mixing the current signal with a local oscillating signal (e.g., LO3) corresponding to the third path 1118. An output of the third mixing module 1158 may be applied to a third amplifying module 1168 coupled to the third mixing module 1166. The third amplifying module 1168 generates a third output voltage ($V_{out}\_CA_3$) for a third downlink carrier based on the frequency-shifted signal. The third amplifying module 1168 then outputs the third output voltage ($V_{out}\_CA_3$). $V_{out}\_CA_3$ may be applied to a baseband filter (e.g., RX baseband filter 260).

In an aspect, the filtering module 1104 attenuates blocker/jammer signals and/or TX leakage in the input signal to produce a first response 1124 for the first path 1114. The first response 1124 may have an input impedance peak at $f_{LO1}$. The filtering module 1104 may further attenuate blocker/jammer signals and/or TX leakage in the input signal to produce a second response 1126 for the second path 1116. The second response 1126 may have an input impedance peak at $f_{LO2}$. The filtering module 1104 may also attenuate blocker/jammer signals and/or TX leakage in the input signal to produce a third response 1128 for the third path 1118. The third response 1128 may have an input impedance peak at $f_{LO3}$. The filtering module 1104 is configured to cascade in series the first response 1124, the second response 1126, and the third response 1128 to preserve a filtering effect. Accordingly, a sum of the first response 1124, the second response 1126, and the third response 1128 may produce the desired response 1130.

By implementing the filtering module 1104, multi-carrier operation is improved, particularly when one carrier is much stronger than another carrier. For example, a noise factor (NF) of a first carrier may be severely degraded if a concurrent second carrier is much stronger and acts as a jammer with respect to the first carrier. The multi-carrier operation is improved by separating channels of the carrier aggregation system and allowing for the isolated attenuation of blocker/jammer signals and/or TX leakage on a separated channel. When a signal is received through the LNA 1102, an input impedance peak of a desired response for the first path 1114 (first downlink carrier) occurs at $f_{LO1}$, an input impedance peak of a desired response for the second path 1116 (second downlink carrier) occurs at $f_{LO2}$, and an input impedance peak of a desired response for the third path 1118 (third downlink carrier) occurs at $f_{LO3}$. Accordingly, because the desired response for the first path 1114 corresponds to $f_{LO1}$, the filtering module 1104 does not attenuate the input signal at $f_{LO1}$ for the first path 1114. However, because the desired response for the second path 1116 and the third path 1118 does not correspond to $f_{LO1}$, the filtering module 1104 attenuates the input signal at $f_{LO1}$ for the second path 1116 and the third path 1118 in order to cancel any blocker/jammer signals and/or TX leakage that may affect the desired response at $f_{LO2}$ and/or $f_{LO3}$.

The filtering module 1104 may apply a similar attenuation technique to the second path 1116 and the third path 1118. For the second path 1116, because the desired response corresponds to $f_{LO2}$, the filtering module 1104 does not attenuate the input signal at $f_{LO2}$ for the second path 1116. However, because the desired response for the first path 1114 and the third path 1118 does not correspond to $f_{LO2}$, the filtering module 1104 attenuates the input signal at $f_{LO2}$ for the first path 1114 and the third path 1118 in order to cancel any blocker/jammer signals and/or TX leakage that may affect the desired response at $f_{LO1}$ and/or $f_{LO3}$.

For the third path 1118, because the desired response corresponds to $f_{LO3}$, the filtering module 1104 does not attenuate the input signal at $f_{LO3}$ for the third path 1118. However, because the desired response for the first path 1114 and the second path 1116 does not correspond to $f_{LO3}$, the filtering module 1104 attenuates the input signal at $f_{LO3}$ for the first path 1114 and the second path 1116 in order to cancel any blocker/jammer signals and/or TX leakage that may affect the desired response at $f_{LO1}$ and/or $f_{LO2}$.

Figure 12:
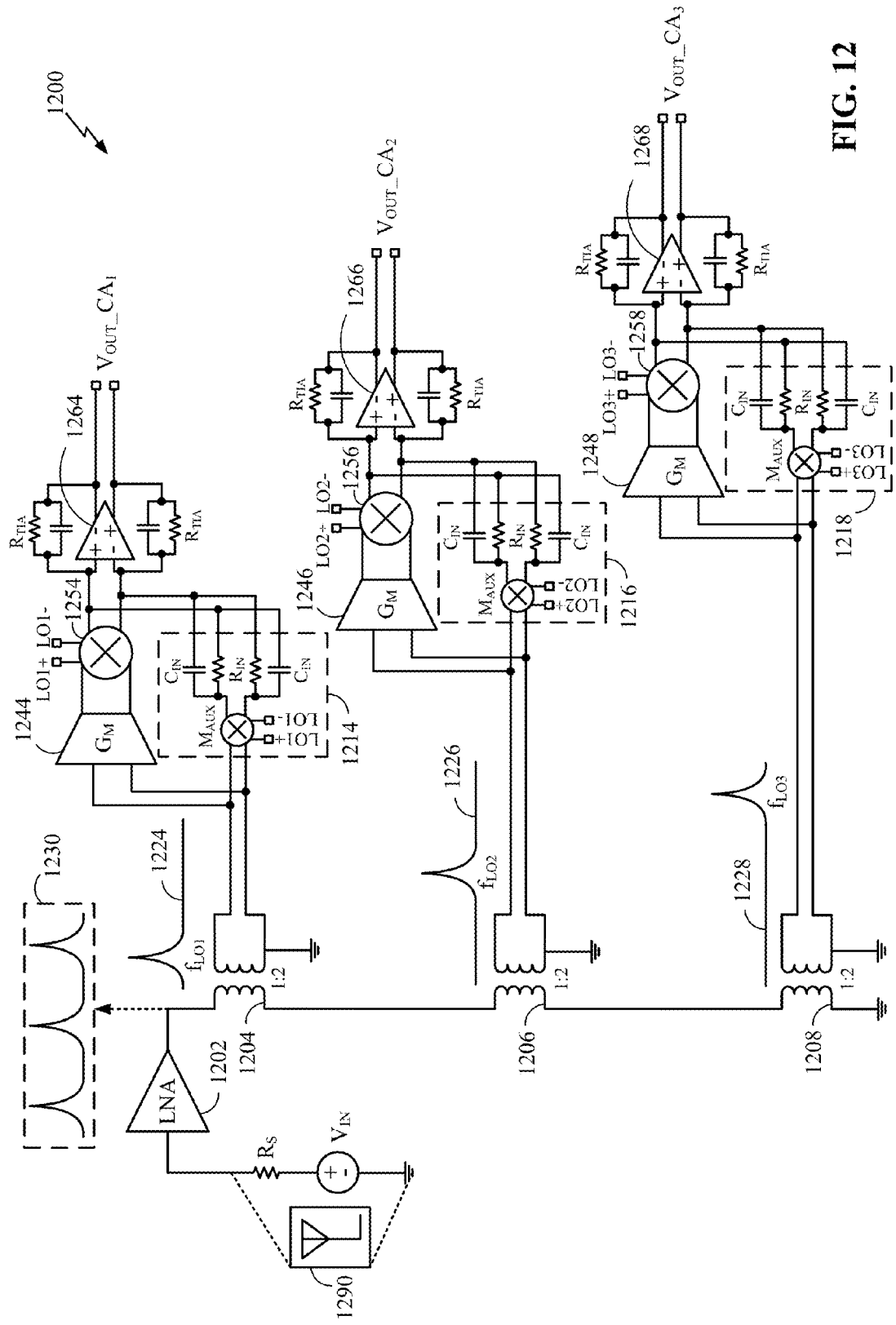
FIG. 12 is a diagram illustrating a circuit implementing an N-path filter in a carrier aggregation system of FIG. 11.

FIG. 12 is a diagram illustrating a circuit 1200 implementing an N-path filter in a carrier aggregation system of FIG. 11. The circuit 1200 may include an LNA 1202 configured to receive an input signal from an antenna 1290. The antenna 1290 may be equivalent to the antenna 290 of FIG. 2A. The LNA 1202 may receive the input signal through a duplexer/switchplexer 264 (see FIG. 2A). As illustrated in FIG. 12, the antenna 1290 is depicted as a voltage source $V_{IN}$ and a resistor $R_S$ connected in series. In an example configuration, the circuit 1200 may include three circuit paths for handling three downlink carriers, respectively.

In an aspect, the circuit 1200 may implement an N-path filter at the output of the LNA 1202 to filter blocker/jammer signals and/or TX leakage and produce a desired response 1230 having a high-Q input impedance (desired response 1230). The N-path filter may operate similarly to the filtering module 1104 of FIG. 11. The desired response 1230 may be similar to the response illustrated in the filter graph 530 of FIG. 5, wherein a first input impedance peak may occur at a first LO signal frequency $f_{LO1}$, a second impedance peak may occur at a second LO signal frequency $f_{LO2}$, and a third impedance peak may occur at a third LO signal frequency $f_{LO3}$. The N-path filter is configured to perform fine filtering such that blocker/jammer signals and/or TX leakage present in the input signal between the first LO signal frequency ($f_{LO1}$) and the second LO signal frequency ($f_{LO2}$), or between $f_{LO2}$ and the third LO signal frequency ($f_{LO3}$), may be attenuated. As such, the N-path filter may attenuate blocker/jammer signals and/or TX leakage (e.g., by 10 to 15 dB or greater) without affecting an input impedance of the desired response 1230 with respect to a particular carrier even when all three downlink carriers are active.

A first circuit path may include a first $G_M$ stage 1244 that receives an input signal from the LNA 1202 and generates a current signal based on the input signal. An output of the first $G_M$ stage 1244 may be applied to a first mixer 1254 coupled to the first $G_M$ stage 1244. The first mixer 1254 is activated by a first LO signal LO1 (LO1+, LO1−). As such, the first mixer 1254 is configured to shift a frequency of the current signal by mixing the current signal with LO1. An output of the first mixer 1254 may be applied to a first amplifier 1264 coupled to the first mixer 1254. The first amplifier 1264 generates a first output voltage ($V_{out\_}CA_1$) for a first downlink carrier based on the frequency-shifted signal. The first amplifier 1264 then outputs the first output voltage ($V_{out\_}CA_1$). $V_{out\_}CA_1$ may be applied to a baseband filter (e.g., RX baseband filter 260). The first $G_M$ stage 1244, the first mixer 1254, and the first amplifier 1264 may be equivalent to the first transconducting module (first $G_M$ stage 1244), a mixing module, such as first mixer 1054, and the first amplifier 1064, respectively.

A second circuit path may include a second $G_M$ stage 1246 that receives an input signal from the LNA 1202 and generates a current signal based on the input signal. An output of the second $G_M$ stage 1246 may be applied to a second mixer 1256 coupled to the second $G_M$ stage 1246. The second mixer 1256 is activated by a second LO signal LO2 (LO2+, LO2−). As such, the second mixer 1256 is configured to shift a frequency of the current signal by mixing the current signal with LO2. An output of the second mixer 1256 may be applied to a second amplifier 1266 coupled to the second mixer 1256. The second amplifier 1266 generates a second output voltage ($V_{out\_}CA_2$) for a second downlink carrier based on the frequency-shifted signal. The second amplifier 1266 then outputs the second output voltage ($V_{out\_}CA_2$). $V_{out\_}CA_2$ may be applied to a baseband filter (e.g., RX baseband filter 260). The second $G_M$ stage 1246, the second mixer 1256, and the second amplifier 1266 may be equivalent to the second transconducting module (second $G_M$ stage 1046), a second mixing module, such as second mixer 1056, and the second amplifier 1066, respectively.

A third circuit path may include a third $G_M$ stage 1248 that receives an input signal from the LNA 1202 and generates a current signal based on the input signal. An output of the third $G_M$ stage 1248 may be applied to a third mixer 1258 coupled to the third $G_M$ stage 1248. The third mixer 1258 is activated by a third LO signal LO3 (LO3+, LO3−). As such, the third mixer 1258 is configured to shift a frequency of the current signal by mixing the current signal with LO3. An output of the third mixer 1258 may be applied to a third amplifier 1268 coupled to the third mixer 1268. The third amplifier 1268 generates a third output voltage ($V_{out\_}CA_3$) for a third downlink carrier based on the frequency-shifted signal. The third amplifier 1268 then outputs the third output voltage ($V_{out\_}CA_3$). $V_{out\_}CA_3$ may be applied to a baseband filter (e.g., RX baseband filter 260). The third $G_M$ stage 1248, the third mixer 1258, and the third amplifier 1268 may be equivalent to the third transconducting module (third $G_M$ stage 1048), the third mixing module 1058, and the third amplifier 1068, respectively.

In an aspect, the N-path filter is configured to attenuate blocker/jammer signals and/or TX leakage in the input signal to generate a first response 1224 for the first circuit path. The first response 1224 may have an input impedance peak at $f_{LO1}$. The N-path filter is further configured to attenuate blocker/jammer signals and/or TX leakage in the input signal to generate a second response 1226 for the second circuit path. The second response 1226 may have an input impedance peak at $f_{LO2}$. The N-path filter is also configured to attenuate blocker/jammer signals and/or TX leakage in the input signal to generate a third response 1228 for the third circuit path. The third response 1228 may have an input impedance peak at $f_{LO3}$. The N-path filter cascades in series the first response 1224, the second response 1226, and the third response 1228 to preserve a filtering effect. A sum of the first response 1224, the second response 1226, and the third response 1228 may produce the desired response 1230.

The N-path filter may include a first auxiliary mixer ($M_{AUX}$) 1214 for the first circuit path, a second auxiliary mixer ($M_{AUX}$) 1216 for the second circuit path, and a third auxiliary mixer ($M_{AUX}$) 1218 for the third circuit path. The N-path filter may further include a first transformer 1204 operatively coupled to the first $M_{AUX}$ 1214, a second transformer 1206 operatively coupled to the second $M_{AUX}$ 1216, and a third transformer 1208 operatively coupled to the third $M_{AUX}$ 1218.

The first $M_{AUX}$ 1214 is driven by LO1 (LO1+, LO1−). When driven, the first $M_{AUX}$ 1214 may attenuate blocker/jammer signals and/or TX leakage in the input signal received from the LNA 1202 (via the first transformer 1204) to produce the first response 1224 having the input impedance peak at $f_{LO1}$. The second $M_{AUX}$ 1216 is driven by LO2 (LO2+, LO2−). When driven, the second $M_{AUX}$ 1216 may attenuate blocker/jammer signals and/or TX leakage in the input signal received from the LNA 1202 (via the second transformer 1206) to produce the second response 1226 having the input impedance peak at $f_{LO2}$. The third $M_{AUX}$ 1218 is driven by LO3 (LO3+, LO3−). When driven, the third $M_{AUX}$ 1218 may attenuate blocker/jammer signals and/or TX leakage in the input signal received from the LNA 1202 (via the third transformer 1208) to produce the third response 1228 having the input impedance peak at $f_{LO3}$.

The first $M_{AUX}$ 1214, the second $M_{AUX}$ 1216, and the third $M_{AUX}$ 1218 may be cascaded in series by cascading the first transformer 1204, the second transformer 1206, and the third transformer 1208. According to the cascaded configuration, a sum of the first response 1224, the second response 1226, and the third response 1228 produces the desired response 1230.

By implementing the N-path filter, multi-carrier operation is improved, particularly when one carrier is much stronger than another carrier. For example, a noise factor (NF) of a first carrier may be severely degraded if a concurrent second carrier is much stronger and acts as a jammer with respect to the first carrier. The multi-carrier operation is improved by separating channels of the carrier aggregation system and allowing for the isolated attenuation of blocker/jammer signals and/or TX leakage on a separated channel. When a signal is received through the LNA 1202, an input impedance peak of a desired response for the first circuit path (first downlink carrier) occurs at $f_{LO1}$, an input impedance peak of a desired response for the second circuit path (second downlink carrier) occurs at $f_{LO2}$, and an input impedance peak of a desired response for the third circuit path (third downlink carrier) occurs at $f_{LO3}$. Accordingly, because the desired response for the first circuit path corresponds to $f_{LO1}$, the N-path filter does not attenuate the input signal at $f_{LO1}$ for the first circuit path. However, because the desired response for the second circuit path and the third circuit path does not correspond to $f_{LO1}$, the N-path filter attenuates the input signal at $f_{LO1}$ for the second circuit path and the third circuit path in order to cancel any blocker/jammer signals and/or TX leakage that may affect the desired response at $f_{LO2}$ and/or $f_{LO3}$.

The N-path filter may apply a similar attenuation technique to the second circuit path and the third circuit path. For the second circuit path, because the desired response corresponds to $f_{LO2}$, the N-path filter does not attenuate the input signal at $f_{LO2}$ for the second circuit path. However, because the desired response for the first circuit path and the third circuit path does not correspond to $f_{LO2}$, the N-path filter attenuates the input signal at $f_{LO2}$ for the first circuit path and the third circuit path in order to cancel any blocker/jammer signals and/or TX leakage that may affect the desired response at $f_{LO1}$ and/or $f_{LO3}$.

For the third circuit path, because the desired response corresponds to $f_{LO3}$, the N-path filter does not attenuate the input signal at $f_{LO3}$ for the third circuit path. However, because the desired response for the first circuit path and the second circuit path does not correspond to $f_{LO3}$, the N-path filter attenuates the input signal at $f_{LO3}$ for the first circuit path and the second circuit path in order to cancel any blocker/jammer signals and/or TX leakage that may affect the desired response at $f_{LO1}$ and/or $f_{LO2}$.

As illustrated in FIG. 12, an output of the first transformer 1204 is coupled to an input of the first $G_M$ stage 1244, an output of the second transformer 1206 is coupled to an input of the second $G_M$ stage 1246, and an output of the third transformer 1208 is coupled to an input of the third $G_M$ stage 1248. However, other configurations of the N-path filter are contemplated in accordance with the present disclosure. In an example configuration, the input of the first $G_M$ stage 1244, the input of the second $G_M$ stage 1246, and the input of the third $G_M$ stage 1248 is not coupled to the output of the first transformer 1204, the output of the second transformer 1206, and the output of the third transformer 1208, respectively. Rather, the input of the first $G_M$ stage 1244, the input of the second $G_M$ stage 1246, and the input of the third $G_M$ stage 1248 is directly coupled to the output of the LNA 1202. Furthermore, in the example configuration, an additional transformer may be coupled between the first $G_M$ stage 1244 and the first mixer 1254, between the second $G_M$ stage 1246 and the second mixer 1256, and between the third $G_M$ stage 1248 and the third mixer 1258.

Figure 13:
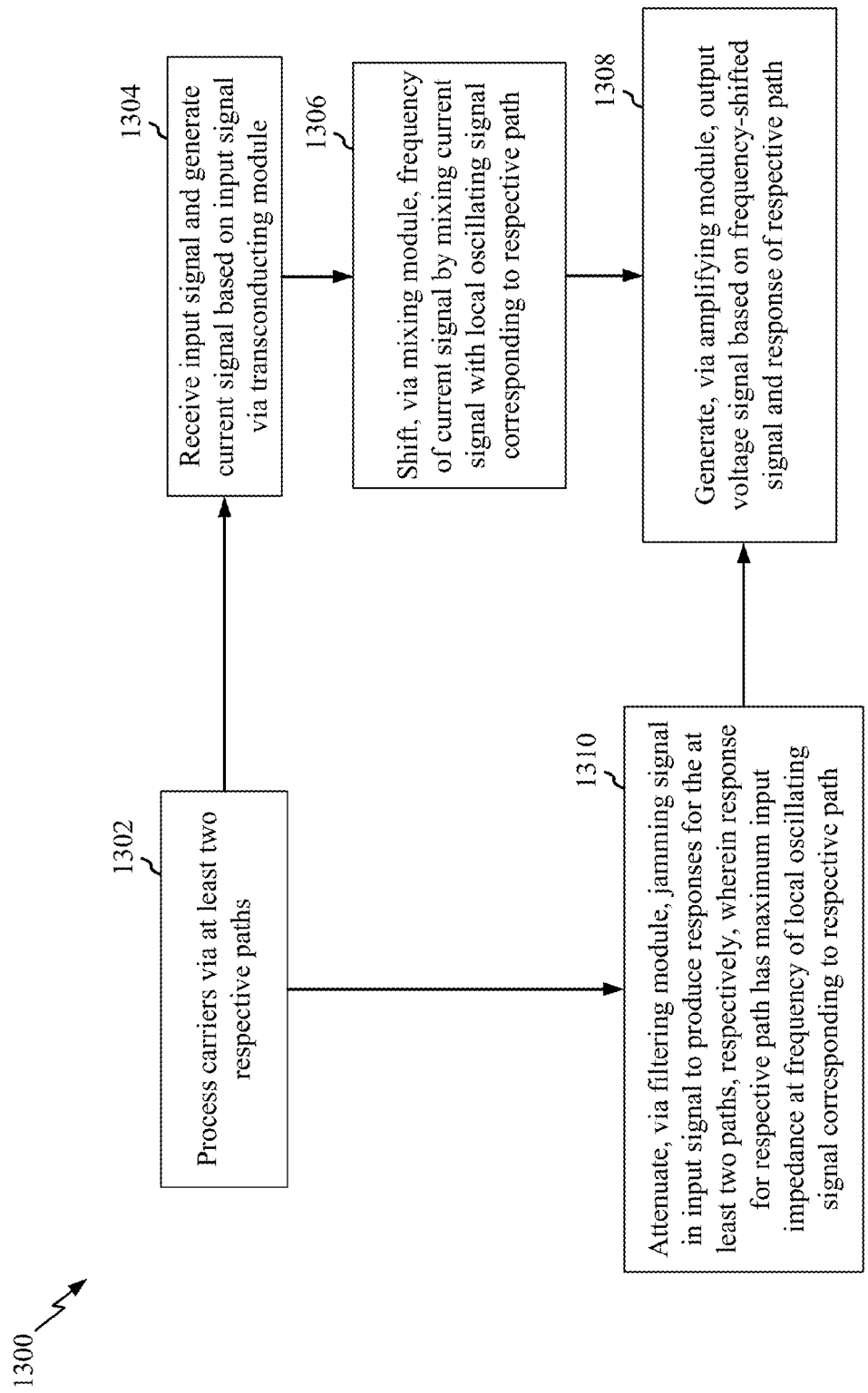
FIG. 13 is a flow chart of a method for filtering a signal in a carrier aggregation system.

FIG. 13 is a flowchart 1300 of a method for filtering a signal in a carrier aggregation system. The method may be performed by an apparatus (e.g., blocker filter 160), via one or more of the LNA 252/802/902, the transconducting module 1144/1146/1148, the mixing module 1154/1156/1158, the amplifying module 1164/1166/1168, and the filtering module 1104 including one or more transformers 1204/1206/1208 and one or more auxiliary mixers 1214/1216/1218.

At block 1302, the apparatus is configured to process carriers via at least two respective paths (e.g., paths 1114, 1116, and 1118). The processing may be described with respect to blocks 1304, 1306, and 1308.

At block 1304, for each path of the at least two paths, the apparatus is configured receive, via a transconducting module (e.g., transconducting module 1144/1146/1148), an input signal from an LNA (e.g., LNA 252/1102/902) and generate a current signal based on the input signal.

At block 1306, for each path of the at least two paths, the apparatus is configured to shift, via a mixing module (e.g., mixing module 1154/1156/1158), a frequency of the current signal by mixing the current signal with a local oscillating signal corresponding to a respective path.

At block 1308, for each path of the at least two paths, the apparatus is configured to generate, via an amplifying module (e.g., amplifying module 1164/1166/1168), an output voltage signal based on the frequency-shifted signal.

While the apparatus performs the processing operations described with respect to blocks 1304, 1306, and 1308, at block 1310, the apparatus is configured to attenuate, via a filtering module (e.g., filtering module 1104), a jamming signal in the input signal to produce responses for the at least two paths, respectively. The filtering module may be coupled between an output of the LNA and an input of the amplifying module of the respective path. In an aspect, a response for the respective path has a maximum input impedance at a frequency of the local oscillating signal corresponding to the respective path. Accordingly, at block 1308, the apparatus may further generate (via the amplifying module) the output voltage signal for the respective path based on the response of the respective path.

In an aspect, the apparatus (via the filter module) cascades the responses in series. Moreover, a sum of the responses is equal to a desired total response for the apparatus.

In an aspect, for the respective path, the apparatus attenuates (via the filtering module) the input signal at one or more frequencies that are not the frequency of the local oscillating signal corresponding to the respective path.

In a further aspect, for the respective path, the apparatus attenuates (via the filtering module) the jamming signal by receiving, via a transformer (e.g., transformer 1204/1206/1208) the input signal, generating, via the transformer, an auxiliary current signal based on the input signal, and shifting, via an auxiliary mixer (e.g., $M_{AUX}$ 1214/1216/1218) a frequency of the auxiliary current signal by mixing the auxiliary current signal with the local oscillating signal corresponding to the respective path. The apparatus may further attenuate the jamming signal by combining the frequency-shifted auxiliary signal from the filtering module (e.g., filtering module 1104) with the frequency-shifted signal output from the mixing module (e.g., mixing module 1154/1156/1158) to produce the response. In an aspect, the transformer corresponding to the respective path is cascaded in series with the transformer corresponding to another path of the at least two paths.

Referring again to FIGS. 8 and 8, an apparatus (e.g., blocker filter 160) may include one or more of the LNA 252/802/902, the transconducting module 1144/1146/1148, the mixing module 1154/1156/1158, the amplifying module 1164/1166/1168, and the filtering module 1104 including one or more transformers 1204/1206/1208 and one or more auxiliary mixers 1214/1216/1218. The apparatus includes means for processing carriers via at least two respective paths, wherein for each path the means for processing comprises: transconducting means for receiving an input signal and generating a current signal based on the input signal, mixing means for shifting a frequency of the current signal by mixing the current signal with a local oscillating signal corresponding to a respective path, and amplifying means for generating an output voltage signal based on the frequency-shifted signal. The apparatus further includes filtering means for attenuating a jamming signal in the input signal to produce responses for the at least two paths, respectively, wherein a response for the respective path has a maximum input impedance at a frequency of the local oscillating signal corresponding to the respective path, and wherein the amplifying means is configured to generate the output voltage signal for the respective path based on the response of the respective path. The aforementioned means may be one or more of one or more of the LNA 252/802/902, the transconducting module 1144/1146/1148, the mixing module 1154/1156/1158, the amplifying module 1164/1166/1168, the filtering module 1104 including one or more transformers 1204/1206/1208 and one or more auxiliary mixers 1214/1216/1218, the data processor/controller 210, the computer-readable medium, i.e., the memory 212, and/or the computer-readable medium, i.e., the memory 216 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects illustrated herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for filtering a signal in a carrier aggregation system, comprising:
    at least two paths configured to process a respective carrier, each path comprising:
        a transconducting module configured to receive an input signal and generate a current signal based on the input signal,
        a mixing module configured to shift a frequency of the current signal by mixing the current signal with a local oscillating signal corresponding to a respective path, and
        an amplifying module configured to generate an output voltage signal based on the frequency-shifted signal; and
    a filtering module configured to attenuate a jamming signal in the input signal to produce responses for the at least two paths, respectively, wherein a response for the respective path has a maximum input impedance at a frequency of the local oscillating signal corresponding to the respective path,
    wherein the amplifying module of the respective path is configured to generate the output voltage signal based on the response of the respective path.

2. The apparatus of claim 1, wherein the filtering module is configured to cascade the responses in series.

3. The apparatus of claim 1, wherein a sum of the responses is equal to a desired total response for the apparatus.

4. The apparatus of claim 1, wherein for the respective path, the filtering module is configured to:
    attenuate the input signal at one or more frequencies that are not the frequency of the local oscillating signal corresponding to the respective path.

5. The apparatus of claim 1, wherein the filtering module is coupled between an input of the apparatus and an input of the amplifying module of the respective path.

6. The apparatus of claim 5, wherein for the respective path, the filtering module comprises:
an auxiliary mixer; and
a transformer coupled to the auxiliary mixer,
wherein the transformer is configured to receive the input signal and generate an auxiliary current signal based on the input signal, and
wherein the auxiliary mixer is configured to shift a frequency of the auxiliary current signal by mixing the auxiliary current signal with the local oscillating signal corresponding to the respective path.

7. The apparatus of claim 6, wherein for the respective path, the frequency-shifted auxiliary signal combines with the frequency-shifted signal to produce the response.

8. The apparatus of claim 6, wherein the transformer corresponding to the respective path is cascaded in series with the transformer corresponding to another path of the at least two paths.

9. A method of an apparatus for filtering a signal in a carrier aggregation system, comprising:
processing carriers via at least two respective paths, wherein for each path the method comprises:
receiving, via a transconducting module, an input signal,
generating, via the transconducting module, a current signal based on the input signal,
shifting, via a mixing module, a frequency of the current signal by mixing the current signal with a local oscillating signal corresponding to a respective path, and
generating, via an amplifying module, an output voltage signal based on the frequency-shifted signal; and
attenuating, via a filtering module, a jamming signal in the input signal to produce responses for the at least two paths, respectively, wherein a response for the respective path has a maximum input impedance at a frequency of the local oscillating signal corresponding to the respective path,
wherein the output voltage signal for the respective path is generated based on the response of the respective path.

10. The method of claim 9, wherein the responses are cascaded in series.

11. The method of claim 9, wherein a sum of the responses is equal to a desired total response for the apparatus.

12. The method of claim 9, wherein for the respective path, the attenuating comprises:
attenuating, via the filtering module, the input signal at one or more frequencies that are not the frequency of the local oscillating signal corresponding to the respective path.

13. The method of claim 9, wherein the filtering module is coupled between an input of the apparatus and an input of the amplifying module of the respective path.

14. The method of claim 13, wherein for the respective path, the attenuating comprises:
receiving, via a transformer of the filtering module, the input signal;
generating, via the transformer, an auxiliary current signal based on the input signal; and
shifting, via an auxiliary mixer of the filtering module, a frequency of the auxiliary current signal by mixing the auxiliary current signal with the local oscillating signal corresponding to the respective path.

15. The method of claim 14, wherein for the respective path, the attenuating further comprises:
combining, via the filtering module, the frequency-shifted auxiliary signal with the frequency-shifted signal output from the mixing module to produce the response.

16. The method of claim 14, wherein the transformer corresponding to the respective path is cascaded in series with the transformer corresponding to another path of the at least two paths.

17. An apparatus for filtering a signal in a carrier aggregation system, comprising:
means for processing carriers via at least two respective paths, wherein for each path the means for processing comprises:
transconducting means for receiving an input signal and generating a current signal based on the input signal,
mixing means for shifting a frequency of the current signal by mixing the current signal with a local oscillating signal corresponding to a respective path, and
amplifying means for generating an output voltage signal based on the frequency-shifted signal; and
filtering means for attenuating a jamming signal in the input signal to produce responses for the at least two paths, respectively, wherein a response for the respective path has a maximum input impedance at a frequency of the local oscillating signal corresponding to the respective path,
wherein the amplifying means is configured to generate the output voltage signal for the respective path based on the response of the respective path.

18. The apparatus of claim 17, wherein the responses are cascaded in series.

19. The apparatus of claim 17, wherein a sum of the responses is equal to a desired total response for the apparatus.

20. The apparatus of claim 17, wherein for the respective path, the filtering means is configured to:
attenuate the input signal at one or more frequencies that are not the frequency of the local oscillating signal corresponding to the respective path.

21. The apparatus of claim 17, wherein the filtering means is coupled between an input of the apparatus and an input of the amplifying means of the respective path.

22. The apparatus of claim 21, wherein for the respective path, the filtering means comprises:
transforming means for receiving the input signal and generating an auxiliary current signal based on the input signal; and
auxiliary mixing means for shifting a frequency of the auxiliary current signal by mixing the auxiliary current signal with the local oscillating signal corresponding to the respective path.

23. The apparatus of claim 22, wherein for the respective path, the auxiliary mixing means is configured to combine the frequency-shifted auxiliary signal with the frequency-shifted signal output from the mixing means to produce the response.

24. The apparatus of claim 22, wherein the transforming means corresponding to the respective path is cascaded in series with the transforming means corresponding to another path of the at least two paths.

* * * * *